United States Patent
Numata et al.

(10) Patent No.: US 12,435,431 B2
(45) Date of Patent: Oct. 7, 2025

(54) METAL POROUS SHEET, FUEL CELL, AND WATER ELECTROLYSIS DEVICE

(71) Applicant: SUMITOMO ELECTRIC INDUSTRIES, LTD., Osaka (JP)

(72) Inventors: Koma Numata, Osaka (JP); Masatoshi Majima, Osaka (JP); Mitsuyasu Ogawa, Osaka (JP); Takahiro Higashino, Osaka (JP); Kazuki Okuno, Osaka (JP); Hiromasa Tawarayama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 965 days.

(21) Appl. No.: 17/251,889

(22) PCT Filed: Apr. 6, 2020

(86) PCT No.: PCT/JP2020/015526
§ 371 (c)(1),
(2) Date: Dec. 14, 2020

(87) PCT Pub. No.: WO2020/235237
PCT Pub. Date: Nov. 26, 2020

(65) Prior Publication Data
US 2021/0119229 A1    Apr. 22, 2021

(30) Foreign Application Priority Data
May 22, 2019 (JP) .................. 2019-096228

(51) Int. Cl.
*C25B 11/031* (2021.01)
*C25B 1/04* (2021.01)
(Continued)

(52) U.S. Cl.
CPC .............. *C25B 11/031* (2021.01); *C25B 1/04* (2013.01); *C25B 9/17* (2021.01); *C25B 9/23* (2021.01);
(Continued)

(58) Field of Classification Search
CPC ........ C25B 9/65; C25B 11/02–11/031; H01M 8/0258–8/0265
See application file for complete search history.

(56) References Cited

U.S. PATENT DOCUMENTS

2002/0028372 A1* 3/2002 Ohlsen ................ H01M 4/8647
429/498
2002/0081477 A1* 6/2002 McLean .............. H01M 8/0273
429/492
(Continued)

FOREIGN PATENT DOCUMENTS

JP    H10-134833 A    5/1998
JP    2003-168448 A    6/2003
(Continued)

*Primary Examiner* — Alexander W Keeling
(74) *Attorney, Agent, or Firm* — Oliff PLC

(57) ABSTRACT

A metal porous sheet includes a metal porous body having a skeleton with a three-dimensional network structure, and has a main surface in which a trench is formed. A depth of the trench is more than or equal to 10 percent of a thickness of the metal porous sheet. An area of the trench is more than or equal to 10 percent of an area of the main surface in a plan view.

9 Claims, 33 Drawing Sheets

(51) Int. Cl.
*C25B 9/17* (2021.01)
*C25B 9/23* (2021.01)
*C25B 9/65* (2021.01)
*H01M 8/0232* (2016.01)
*H01M 8/026* (2016.01)
*H01M 8/12* (2016.01)

(52) U.S. Cl.
CPC ............... *C25B 9/65* (2021.01); *H01M 8/026* (2013.01); *H01M 8/0232* (2013.01); *H01M 2008/1293* (2013.01)

(56) References Cited

U.S. PATENT DOCUMENTS

| | | |
|---|---|---|
| 2003/0104268 A1 | 6/2003 | Shibata et al. |
| 2015/0263355 A1 | 9/2015 | Hiraiwa et al. |
| 2016/0186337 A1* | 6/2016 | Yokota .................. C02F 1/4672 204/252 |
| 2017/0012299 A1* | 1/2017 | Itou ..................... H01M 8/0263 |
| 2018/0205095 A1* | 7/2018 | Hiraiwa ..................... C25B 1/04 |
| 2019/0044159 A1 | 2/2019 | Miyamoto et al. |
| 2019/0221868 A1* | 7/2019 | Gambini ............. H01M 8/0232 |

FOREIGN PATENT DOCUMENTS

| | | | |
|---|---|---|---|
| JP | 2009-187887 A | 8/2009 | |
| JP | 2017-033918 A | 2/2017 | |
| WO | 2014/057877 A1 | 4/2014 | |
| WO | WO-2017010436 A1 * | 1/2017 | ............... C25B 1/04 |

\* cited by examiner

METAL POROUS SHEET, FUEL CELL, AND WATER ELECTROLYSIS DEVICE

TECHNICAL FIELD

The present disclosure relates to a metal porous sheet, a fuel cell, and a water electrolysis device. The present application claims priority to Japanese Patent Application No. 2019-096228 filed on May 22, 2019, the entire contents of which are incorporated herein by reference.

BACKGROUND ART

Conventionally, a solid oxide fuel cell (SOFC) has been known as a type of fuel cell. Generally, the solid oxide fuel cell has a first interconnector, a fuel electrode current collector (gas diffusion layer) arranged on the first interconnector, a fuel electrode arranged on the fuel electrode current collector, a solid electrolyte arranged on the fuel electrode, an oxygen electrode arranged on the solid electrolyte, an oxygen electrode current collector arranged on the oxygen electrode, and a second interconnector arranged on the oxygen electrode current collector (hereinafter, the first interconnector and the second interconnector will each be referred to as an "interconnector", and the fuel electrode current collector and the oxygen electrode current collector will each be referred to as a "current collector").

For example, PTL 1 (Japanese Patent Laying-Open No. 2017-33918) proposes applying a metal porous body having a skeleton with a three-dimensional network structure, as a current collector.

CITATION LIST

Patent Literature

PTL 1: Japanese Patent Laying-Open No. 2017-33918

SUMMARY OF INVENTION

A metal porous sheet of the present disclosure includes a metal porous body having a skeleton with a three-dimensional network structure, and has a main surface in which a trench is formed. A depth of the trench is more than or equal to 10 percent of a thickness of the metal porous sheet. An area of the trench is more than or equal to 10 percent of an area of the main surface in a plan view.

DETAILED DESCRIPTION

Figure 1:
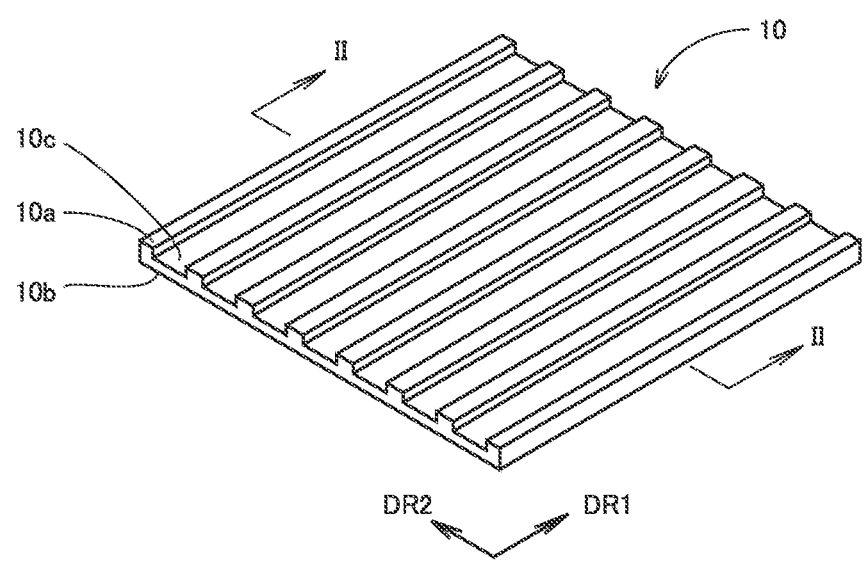
FIG. 1 is a perspective view of a metal porous sheet 10.

Problem to be Solved by the Present Disclosure

In a solid oxide fuel cell, trenches may be formed in a main surface of an interconnector facing a current collector in order to allow a gas to flow uniformly to the current collector. The interconnector is formed of an iron (Fe)-chromium (Cr) alloy, for example. Since the iron-chromium alloy is a hard-to-work alloy, it is difficult to form the trenches described above by machining. In addition, although the trenches described above can be formed for example by etching, manufacturing cost thereof is increased.

When the trenches described above are not formed (that is, when the surface of the interconnector facing the current collector is flat), the gas flows through only the inside of the current collector, causing an increase in pressure loss associated with circulation of the gas.

An object of the present disclosure is to provide a metal porous sheet that can decrease manufacturing cost while suppressing an increase in pressure loss associated with circulation of a gas.

Effect of the Present Disclosure

According to the metal porous sheet of the present disclosure, manufacturing cost can be decreased while suppressing an increase in pressure loss associated with circulation of a gas.

Description of Embodiments of the Present Disclosure

First, embodiments of the present disclosure will be described in list form.

(1) A metal porous sheet in accordance with one embodiment includes a metal porous body having a skeleton with a three-dimensional network structure, and has a main surface in which a trench is formed. A depth of the trench is more than or equal to 10 percent of a thickness of the metal porous sheet. An area of the trench is more than or equal to 10 percent of an area of the main surface in a plan view.

According to the metal porous sheet described above, manufacturing cost can be decreased while suppressing an increase in pressure loss associated with circulation of a gas.

(2) In the metal porous sheet described above, the depth of the trench may be more than or equal to 30 percent and less than or equal to 90 percent of the thickness of the metal porous sheet. In this case, uniformity of flow of the gas in a fuel cell current collector can be improved while further suppressing an increase in pressure loss associated with circulation of the gas.

(3) In the metal porous sheet described above, the area of the trench may be more than or equal to 30 percent and less than or equal to 90 percent of the area of the main surface in a plan view. In this case, uniformity of flow of the gas in the metal porous sheet can be improved while further suppressing an increase in pressure loss associated with circulation of the gas.

(4) In the metal porous sheet described above, the trench may have a first side surface and a second side surface facing each other in a cross sectional view. A distance between the first side surface and the second side surface may decrease with distance from the main surface.

(5) In the metal porous sheet described above, a plurality of the trenches may be arranged to form a plurality of columns extending along a first direction in a plan view. Depths of the trenches belonging to each of the columns may increase from one side in the first direction toward the other side in the first direction.

(6) A fuel cell in accordance with one embodiment includes the metal porous sheet described above, and an interconnector arranged to face the main surface of the metal porous sheet described above.

According to the fuel cell described above, manufacturing cost can be decreased while suppressing an increase in pressure loss associated with circulation of a gas.

(7) In the fuel cell described above, the metal porous sheet may be arranged such that a gas is supplied along a direction intersecting the trench. In this case, the gas is allowed to flow more uniformly to the metal porous sheet.

(8) In the fuel cell described above, the metal porous sheet may be arranged such that a gas is supplied along a direction parallel to the trench. In this case, an increase in pressure loss associated with circulation of the gas can be further suppressed.

(9) A water electrolysis device in accordance with one embodiment includes the metal porous sheet described above, and an interconnector arranged to face the main surface of the metal porous sheet described above.

According to the water electrolysis device described above, uniformity of flow of an aqueous solution in a hydrogen generation electrode and an oxygen generation electrode can be improved, and a pressure loss when the aqueous solution passes through the hydrogen generation electrode and the oxygen generation electrode can be decreased. As a result, the water electrolysis device can decrease a voltage applied between the hydrogen generation electrode and the oxygen generation electrode when it generates hydrogen gas and oxygen gas.

Details of Embodiments of the Present Disclosure

Next, details of the embodiments of the present disclosure will be described with reference to the drawings. In the drawings below, identical or corresponding parts will be designated by the same reference numerals, and redundant description will not be repeated.

Configuration of Metal Porous Sheet in Accordance with First Embodiment

A configuration of a metal porous sheet in accordance with a first embodiment (hereinafter referred to as a "metal porous sheet 10") will be described below.

FIG. 1 is a perspective view of metal porous sheet 10. Metal porous sheet 10 is a current collector for a fuel cell, for example. Metal porous sheet 10 may be an electrode for a water electrolysis device. As shown in FIG. 1, metal porous sheet 10 has a sheet-like shape. Metal porous sheet 10 has a first main surface 10a and a second main surface 10b. Of a plurality of surfaces constituting metal porous sheet 10, first main surface 10a and second main surface 10b are a pair of surfaces having an area relatively larger than those of the other surfaces. Metal porous sheet 10 has a rectangular shape in a plan view. In the following, a plan view refers to a view in a case where metal porous sheet 10 is viewed from a direction orthogonal to first main surface 10a.

Figure 2:
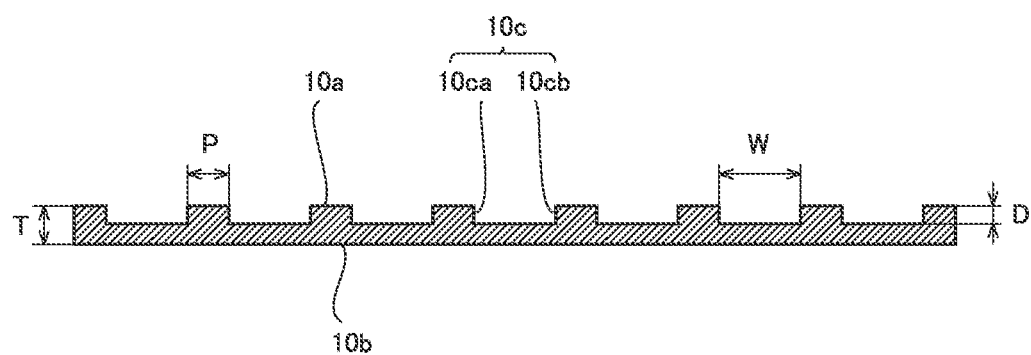
FIG. 2 is a cross sectional view along II-II in FIG. 1.

FIG. 2 is a cross sectional view along II-II in FIG. 1. As shown in FIG. 2, trenches 10c are formed in first main surface 10a. In each trench 10c, first main surface 10a is recessed toward second main surface 10b. That is, the portion of first main surface 10a that is more recessed toward second main surface 10b than its surroundings is trench 10c.

Metal porous sheet 10 has a thickness T. Thickness T is a distance between first main surface 10a and second main surface 10b. Each trench 10c has a depth D. Depth D is a distance between first main surface 10a at the portion where trench 10c is not formed and a bottom portion of trench 10c at a position closest to second main surface 10b. Depth D is more than or equal to 10 percent of thickness T. Preferably, depth D is more than or equal to 30 percent of thickness T. Depth D is less than or equal to 90 percent of thickness T.

As shown in FIG. 1, trenches 10c extend along a first direction DR1 in a plan view. A plurality of trenches 10c are formed to be spaced along a second direction DR2. Second direction DR2 is a direction orthogonal to first direction DR1.

As shown in FIG. 2, each trench 10c has a rectangular shape in a cross sectional view orthogonal to first direction DR1. Trench 10c has a side surface 10ca and a side surface 10cb. Side surface 10ca and side surface 10cb face each other in second direction DR2. A distance between side surface 10ca and side surface 10cb is herein referred to as a width W of trench 10c. Preferably, width W is more than or equal to 1 mm. More preferably, width W is more than or equal to 5 mm. Width W may be more than or equal to 25 mm.

A minimum value of a distance between side surface 10ca of one trench 10c and side surface 10cb of another trench 10c adjacent to the one trench 10c in second direction DR2 is herein referred to as a pitch P. Pitch P is constant, for example.

The total area of trenches 10c in a plan view is herein referred to as a first area. The area of first main surface 10a in a plan view is herein referred to as a second area. The first area is more than or equal to 10 percent of the second area. Preferably, the first area is more than or equal to 30 percent of the second area. The first area is less than or equal to 90 percent of the second area. In the following, the ratio of the first area to the second area may be referred to as a trench ratio.

Figure 3:
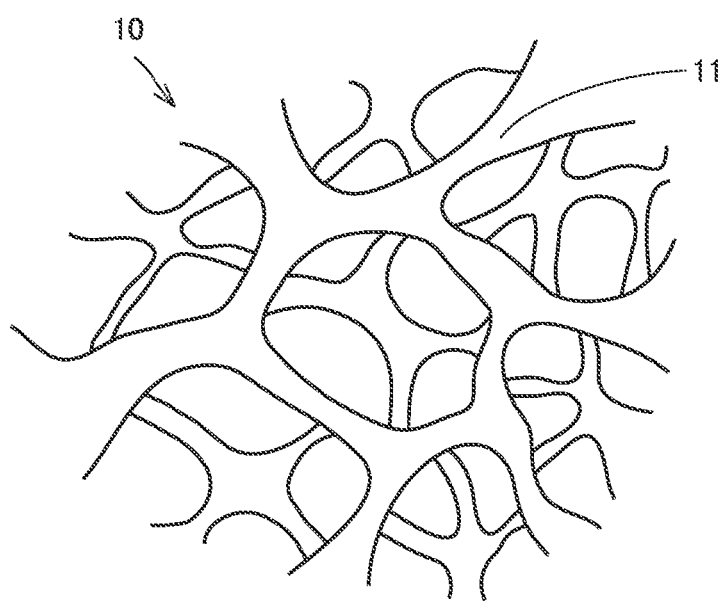
FIG. 3 is a schematic view showing an internal structure of metal porous sheet 10.

FIG. 3 is a schematic view showing an internal structure of metal porous sheet 10. As shown in FIG. 3, metal porous sheet 10 is formed of a metal porous body. The metal porous body has a skeleton 11 with a three-dimensional network structure.

Figure 4:
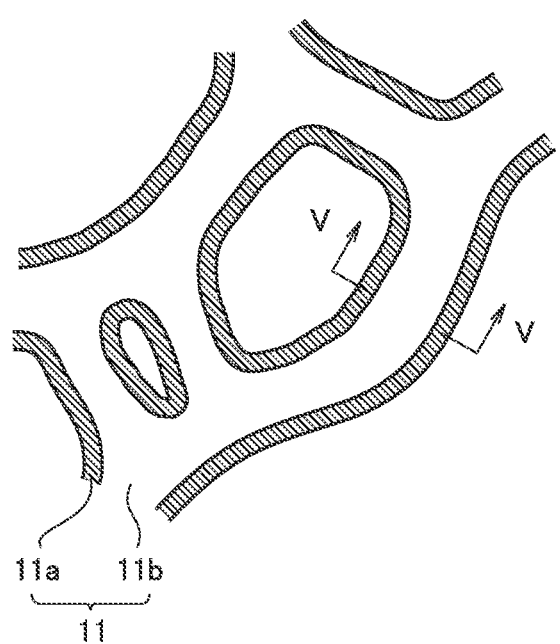
FIG. 4 is an enlarged cross sectional view showing an internal structure of metal porous sheet 10.
Figure 5:
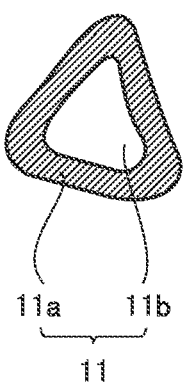
FIG. 5 is a cross sectional view along V-V in FIG. 4.

FIG. 4 is an enlarged cross sectional view showing an internal structure of metal porous sheet 10. FIG. 5 is a cross sectional view along V-V in FIG. 4. As shown in FIGS. 4 and 5, skeleton 11 has a hollow cylindrical shape. That is, skeleton 11 has a skeleton main body 11a, and an internal space 11b defined by skeleton main body 11a. Skeleton main body 11a is formed of a metal material. The metal material is nickel (Ni) or a nickel alloy, for example. Skeleton main body 11a has a triangular shape in a cross sectional view intersecting an extending direction. It should be noted that the triangular shape does not have to be a mathematically precise triangular shape. Skeleton 11 may be solid.

In the metal porous body, a space between skeletons 11 serves as a pore. The porosity in the metal porous body is more than or equal to 40 percent and less than or equal to 98 percent, for example. It should be noted that the porosity in the metal porous body is calculated by {apparent volume of the metal porous body−(weight of the metal porous body÷density of the metal material constituting the skeleton)}÷apparent volume of the metal porous body×100.

It should be noted that, in addition to the example described above, metal porous sheet 10 may be formed of a sintered body of a material having pores formed therein.

Method for Manufacturing Metal Porous Sheet in Accordance with First Embodiment

A method for manufacturing metal porous sheet 10 will be described below.

Figure 6:
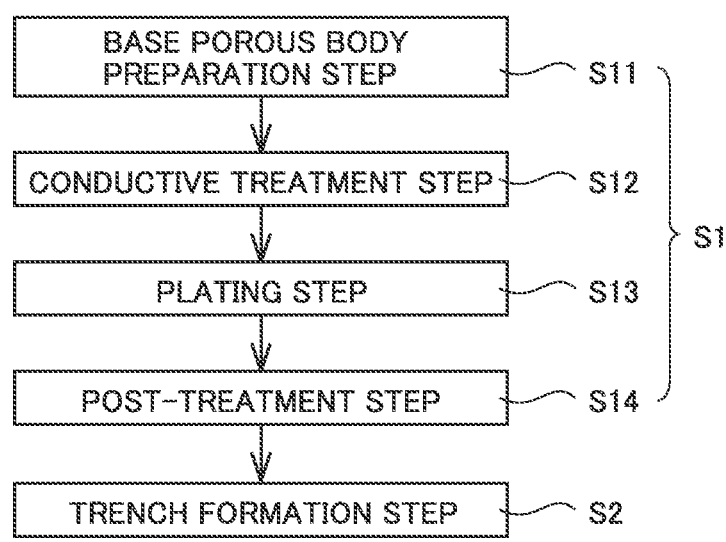
FIG. 6 is a process chart showing a method for manufacturing metal porous sheet 10.

FIG. 6 is a process chart showing a method for manufacturing metal porous sheet 10. As shown in FIG. 6, the method for manufacturing metal porous sheet 10 has a metal porous body formation step S1 and a trench formation step S2. Metal porous body formation step S1 has a base porous body preparation step S11, a conductive treatment step S12, a plating step S13, and a post-treatment step S14.

In base porous body preparation step S11, a base porous body is prepared. The base porous body is a porous body formed of a resin material such as urethane foam, styrene foam, or the like, for example. The base porous body has a sheet-like shape.

In conductive treatment step S12, a conductive coating layer is formed on a surface of the base porous body. The conductive coating layer is formed of a conductive material such as a metal material, a carbon material, or the like. Conductive treatment step S12 is performed as appropriate by sputtering, plating, or the like, depending on the material for the conductive coating layer.

In plating step S13, a material constituting skeleton main body 11a is formed on the surface of the base porous body (that is, on the conductive coating layer). Plating step S13 is performed by electroplating, for example.

In post-treatment step S14, the base porous body is removed. In post-treatment step S14, first heat treatment and second heat treatment are performed. The first heat treatment is heat treatment for removing the base porous body by oxidation. The first heat treatment is performed under an oxidizing atmosphere. On this occasion, the base porous body is removed by oxidation, and skeleton main body 11a formed on the surface of the base porous body is oxidized. After the first heat treatment, the space in which the base porous body has existed before the first heat treatment serves as internal space 11b of skeleton 11. The second heat treatment is heat treatment under a reducing atmosphere for reducing skeleton main body 11a oxidized in the first heat treatment. Thus, a sheet-like metal porous body having skeleton 11 with a three-dimensional network structure is formed.

The sheet-like metal porous body formed in metal porous body formation step S1 has first main surface 10a and second main surface 10b. In trench formation step S2, trenches 10c are formed in first main surface 10a. Formation of trenches 10c is performed by pressing a metal mold against first main surface 10a. Since the metal mold has protrusions corresponding to the shape of trenches 10c, the shape of the protrusions is transferred onto first main surface 10a by pressing the metal mold against first main surface 10a, and thereby trenches 10c are formed. Thus, metal porous sheet 10 is formed.

Configuration of Fuel Cell in Accordance with First Embodiment

A configuration of a fuel cell in accordance with the first embodiment (hereinafter referred to as a "fuel cell 100") will be described below.

Figure 7:
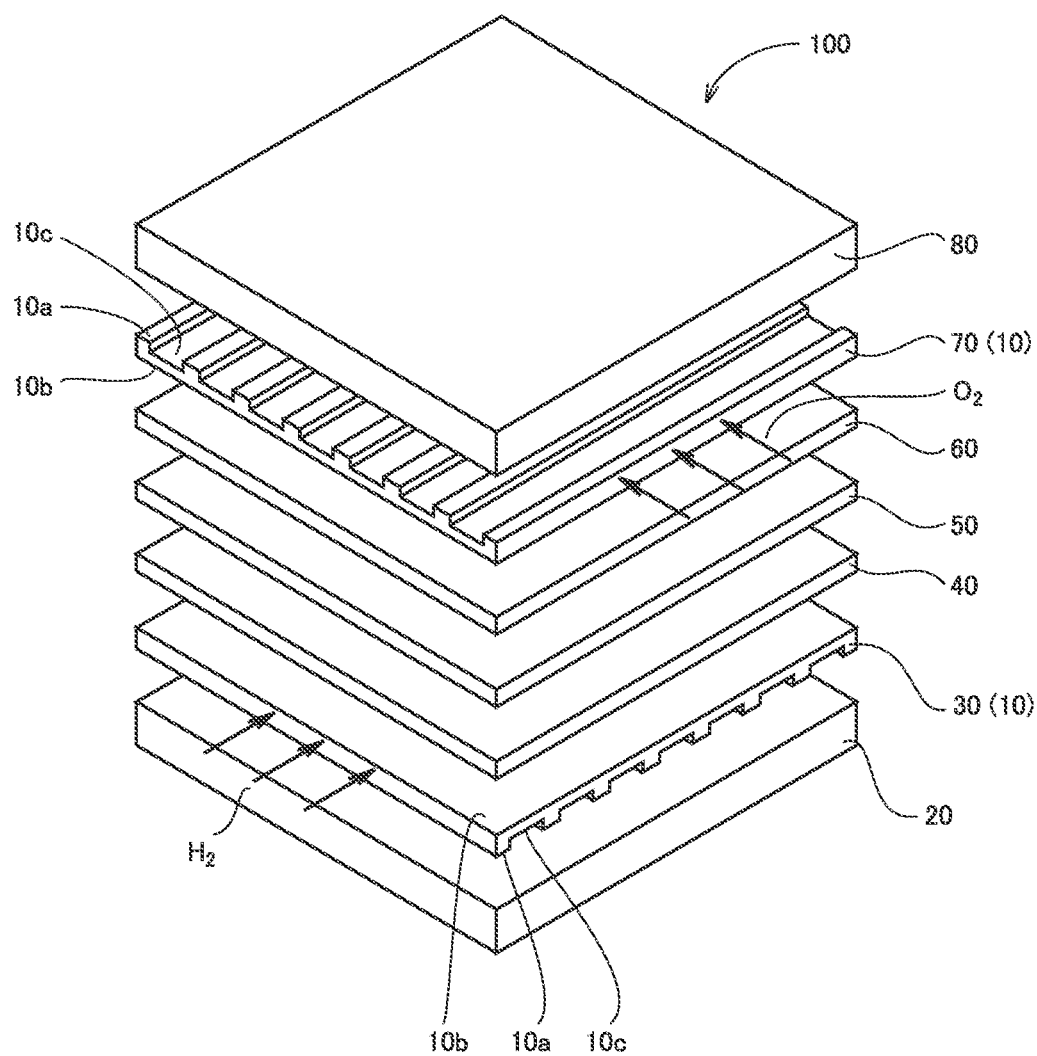
FIG. 7 is an exploded perspective view of a fuel cell 100.

FIG. 7 is an exploded perspective view of fuel cell 100. As shown in FIG. 7, fuel cell 100 is a planar-type solid oxide fuel cell.

Fuel cell 100 has an interconnector 20, a fuel electrode current collector 30, a fuel electrode 40, a solid electrolyte 50, an oxygen electrode 60, an oxygen electrode current collector 70, and an interconnector 80. Although not shown, fuel cell 100 has a cell stack constituted by stacking single cell structures each including interconnector 20, fuel electrode current collector 30, fuel electrode 40, solid electrolyte 50, oxygen electrode 60, oxygen electrode current collector 70, and interconnector 80.

Interconnector 20 is a flat plate-like member. Interconnector 20 is formed of an iron-chromium alloy, for example. A surface of interconnector 20 facing fuel electrode current collector 30 is flat (trenches are not formed therein). Fuel electrode current collector 30 is arranged on interconnector 20. Metal porous sheet 10 is used for fuel electrode current collector 30. Fuel electrode current collector 30 is arranged such that first main surface 10a faces interconnector 20.

Fuel electrode 40 is a sheet-like porous body. The porous body constituting fuel electrode 40 is formed of a mixture of zirconia ($ZrO_2$) and nickel, for example. Fuel electrode 40 is arranged on fuel electrode current collector 30 (more specifically, on second main surface 10b).

Solid electrolyte 50 is a sheet-like member that allows oxygen ions to permeate therethrough. Solid electrolyte 50 is formed of stabilized zirconia (YSZ), for example. Solid electrolyte 50 is arranged on fuel electrode 40.

Oxygen electrode 60 is a flat plate-like porous body. The porous body constituting oxygen electrode 60 is formed of (La, Sr) MnO$_3$ (lanthanum strontium manganite), (La, Sr) CoO$_3$ (lanthanum strontium cobaltite), or the like, for example. Oxygen electrode 60 is arranged on solid electrolyte 50.

Metal porous sheet 10 is used for oxygen electrode current collector 70. Oxygen electrode current collector 70 is arranged on oxygen electrode 60 such that second main surface 10b faces oxygen electrode 60. Interconnector 80 is a flat plate-like member. Interconnector 80 is formed of an iron-chromium alloy, for example. Interconnector 80 is arranged on oxygen electrode current collector 70 to face first main surface 10a of oxygen electrode current collector 70. A surface of interconnector 20 facing fuel electrode current collector 30 is flat (trenches are not formed therein). Although not shown, interconnector 80 is electrically connected to interconnector 20.

Hydrogen (H$_2$) gas is supplied to fuel electrode current collector 30. Preferably, fuel electrode current collector 30 is arranged such that trenches 10c intersect a direction in which the hydrogen gas is supplied. More preferably, fuel electrode current collector 30 is arranged such that trenches 10c are orthogonal to the direction in which the hydrogen gas is supplied. Fuel electrode current collector 30 may be arranged such that trenches 10c are parallel to the direction in which the hydrogen gas is supplied.

Oxygen (O$_2$) gas is supplied to oxygen electrode current collector 70. Preferably, oxygen electrode current collector 70 is arranged such that trenches 10c intersect a direction in which the oxygen gas is supplied. More preferably, oxygen electrode current collector 70 is arranged such that trenches 10c are orthogonal to the direction in which the oxygen gas is supplied. Oxygen electrode current collector 70 may be arranged such that trenches 10c are parallel to the direction in which the hydrogen gas is supplied.

Oxygen ions move from oxygen electrode 60 to fuel electrode 40 through solid electrolyte 50. The oxygen ions that have reached fuel electrode 40 react with the hydrogen gas supplied to fuel electrode 40 through fuel electrode current collector 30, and generate water (H$_2$O) and electrons. The generated electrons are supplied to oxygen electrode 60 through interconnector 20, interconnector 80, and oxygen electrode current collector 70, and ionize the oxygen gas supplied to oxygen electrode 60 through oxygen electrode current collector 70. By repeating the above reaction, fuel cell 100 generates electric power.

Configuration of Water Electrolysis Device in Accordance with First Embodiment

A configuration of a water electrolysis device in accordance with the first embodiment (hereinafter referred to as a "water electrolysis device 200") will be described below.

Figure 8:
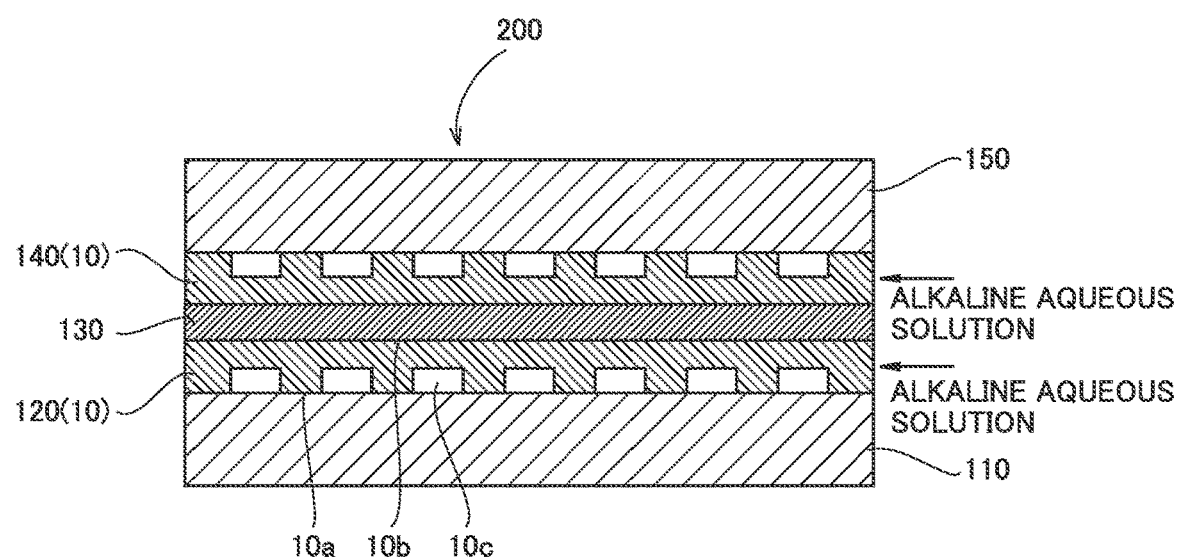
FIG. 8 is a cross sectional view of a water electrolysis device 200.

Water electrolysis device 200 is an alkaline water electrolysis device, for example. FIG. 8 is a cross sectional view of water electrolysis device 200. As shown in FIG. 8, water electrolysis device 200 has an interconnector 110, a hydrogen generation electrode 120, a diaphragm 130, an oxygen generation electrode 140, and an interconnector 150.

Interconnector 110 is a flat plate-like member, and is formed of an iron-chromium alloy, for example. A surface of interconnector 110 facing hydrogen generation electrode 120 is flat (trenches are not formed therein). Hydrogen generation electrode 120 is arranged on interconnector 110. Metal porous sheet 10 is used for hydrogen generation electrode 120. Hydrogen generation electrode 120 is arranged such that first main surface 10a faces interconnector 110.

Diaphragm 130 is arranged on hydrogen generation electrode 120. Diaphragm 130 is formed of a material that allows H$^+$ (hydrogen ions) to permeate therethrough. Oxygen generation electrode 140 is arranged on diaphragm 130. Metal porous sheet 10 is used for oxygen generation electrode 140. Oxygen generation electrode 140 is arranged on diaphragm 130 such that second main surface 10b faces diaphragm 130. Interconnector 150 is a flat plate-like member, and is formed of an iron-chromium alloy, for example. Interconnector 150 is arranged on oxygen generation electrode 140 to face first main surface 10a of oxygen generation electrode 140. It should be noted that, although not shown, interconnector 150 is electrically connected to interconnector 110.

When water electrolysis device 200 is operated, a voltage is applied between interconnector 110 and interconnector 150 such that an electric potential in hydrogen generation electrode 120 becomes lower than an electric potential in oxygen generation electrode 140. When water electrolysis device 200 is operated, an alkaline aqueous solution is supplied to hydrogen generation electrode 120 and oxygen generation electrode 140. The alkaline aqueous solution is an aqueous solution of potassium hydroxide (KOH), or an aqueous solution of sodium hydroxide (NaOH), for example. The alkaline aqueous solution may be supplied to hydrogen generation electrode 120 and oxygen generation electrode 140 along a direction intersecting trenches 10c, or along a direction parallel to trenches 10c.

When water electrolysis device 200 is operated, in oxygen generation electrode 140, hydroxide ions included in the alkaline aqueous solution are oxidized, and thereby oxygen gas is generated. From oxygen generation electrode 140, hydrogen ions move to hydrogen generation electrode 120 through diaphragm 130. In hydrogen generation electrode 120, the hydrogen ions are reduced, and thereby hydrogen gas is generated. By repeating such a reaction, the hydrogen gas and the oxygen gas are generated in hydrogen generation electrode 120 and oxygen generation electrode 140.

EXAMPLE

An Example of metal porous sheet 10 and fuel cell 100 will be described below.

Figure 9:
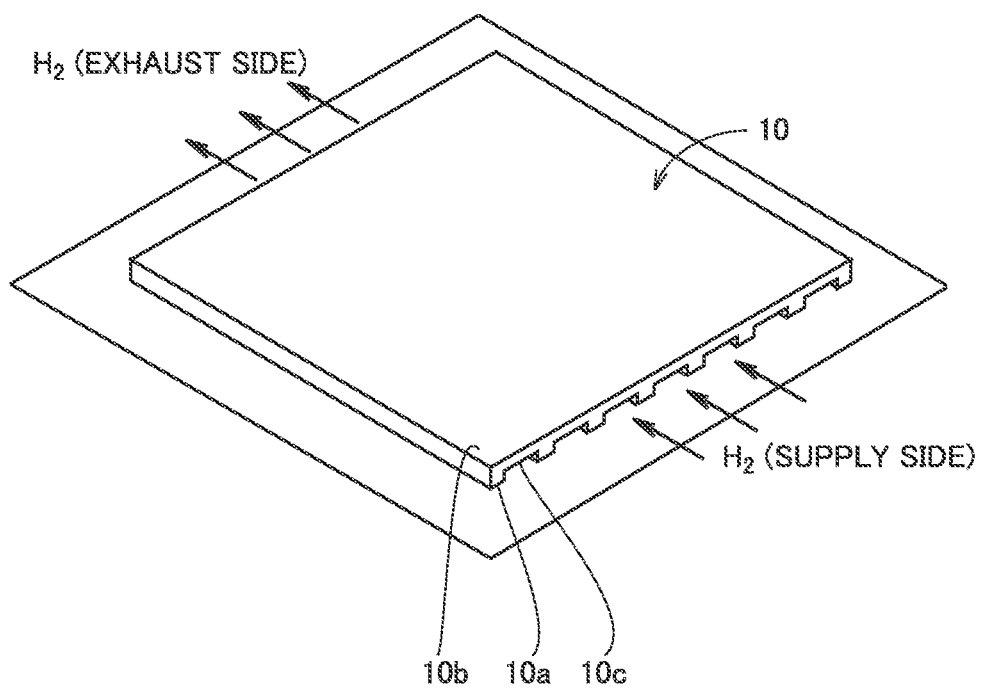
FIG. 9 is a first explanatory diagram for explaining a method for evaluating a pressure loss in an Example.
Figure 10:
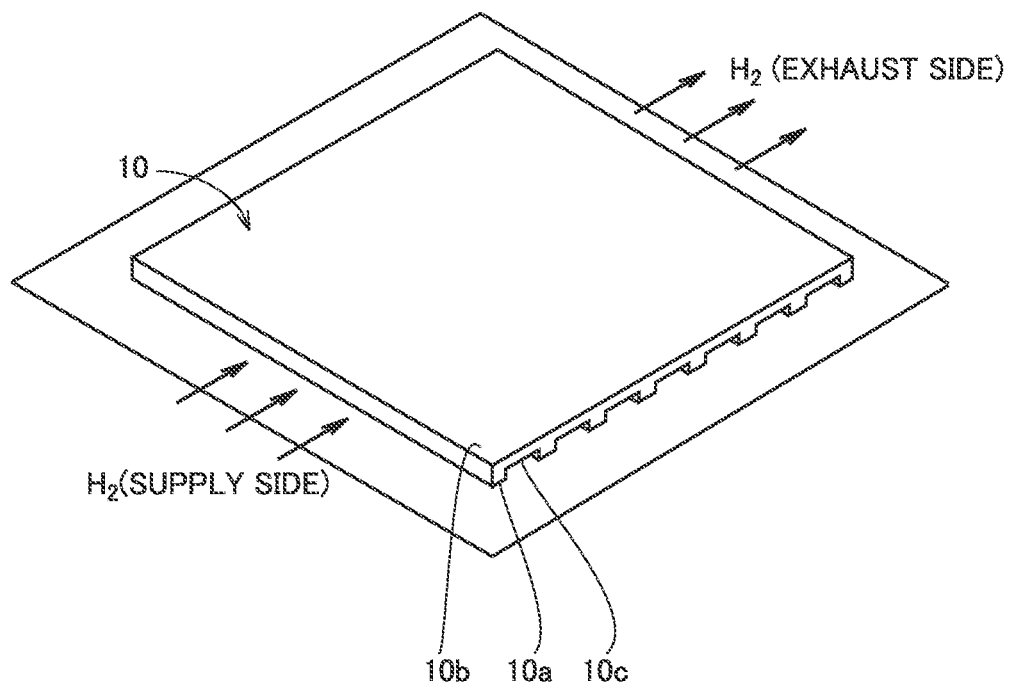
FIG. 10 is a second explanatory diagram for explaining the method for evaluating a pressure loss in the Example.

FIG. 9 is a first explanatory diagram for explaining a method for evaluating a pressure loss in an Example. FIG. 10 is a second explanatory diagram for explaining the method for evaluating a pressure loss in the Example. As shown in FIGS. 9 and 10, in the evaluation of a pressure loss in the Example, hydrogen gas was supplied to metal porous sheet 10 from one end side of metal porous sheet 10, and the hydrogen gas was exhausted from the other end side of metal porous sheet 10. In the evaluation of a pressure loss, the flow rate of the hydrogen gas was set to 0.5 L/minute. In the evaluation of a pressure loss, the temperature of the hydrogen gas was set to 800° C.

The evaluation of a pressure loss in the Example was performed for a case where the direction in which the hydrogen gas was supplied was parallel to trenches 10c (the case shown in FIG. 9) and a case where the direction in which the hydrogen gas was supplied was orthogonal to trenches 10c (the case shown in FIG. 10). The evaluation of a pressure loss was performed based on the ratio of the pressure of the hydrogen gas exhausted from metal porous sheet 10 to the pressure of the hydrogen gas supplied to metal porous sheet 10. When a pressure loss was less than 80 percent of a pressure loss in sample 1 (hereinafter referred to as a "reference pressure loss"), the pressure loss was evaluated as good.

Table 1 shows details of samples used for the evaluation of a pressure loss. As shown in Table 1, trenches 10c were not formed in sample 1, and trenches 10c were formed in samples 2 to 25. All samples 1 to 25 had thickness T of 500 μm.

In samples 2 to 13, metal porous sheet 10 was arranged such that trenches 10c were parallel to the direction in which the hydrogen gas was supplied. In samples 14 to 25, metal porous sheet 10 was arranged such that trenches 10c were orthogonal to the direction in which the hydrogen gas was supplied.

In samples 2 to 6 and samples 14 to 18, width W and the trench ratio were set to be constant, and the ratio of depth D to thickness T was changed in a range of more than or equal to 8 percent and less than or equal to 96 percent. It should be noted that, in samples 2 to 6 and samples 14 to 18, since width W and the trench ratio were constant, pitch P was also constant.

In samples 7 to 11 and samples 19 to 23, the ratio of depth D to thickness T and width W were set to be constant, and the trench ratio was changed in a range of more than or equal to 8 percent and less than or equal to 91 percent. It should be noted that, in samples 7 to 11 and samples 19 to 23, since width W was constant and the trench ratio was changed, pitch P was also changed in proportion to the change in the trench ratio.

In samples 12, 13, 24, and 25, the ratio of depth D to thickness T and the trench ratio were set to be constant, and width W and pitch P were changed.

In samples 2, 14, and 19, the pressure loss was more than or equal to 80 percent and less than 100 percent of the reference pressure loss. In the samples other than samples 1, 2, 14, and 19, the pressure loss was less than 80 percent of the reference pressure loss. It has become clear from this comparison that the pressure loss can be decreased by setting the ratio of depth D to thickness T to more than or equal to 10 percent, and setting the trench ratio to more than or equal to 10 percent.

In samples 2 to 6 and samples 14 to 18, the pressure loss was decreased with an increase in the ratio of depth D to thickness T. In samples 12, 13, 24, and 25, the pressure loss was not changed even though width W and pitch P were changed. In samples 7 to 11 and samples 19 to 23, the pressure loss was decreased with an increase in the trench ratio.

Table 1 further shows outputs in fuel cells 100 using samples 1 to 25 for fuel electrode current collector 30 and oxygen electrode current collector 70. When an output of fuel cell 100 was more than 1.15 times an output of fuel cell 100 using sample 1 for fuel electrode current collector 30 and oxygen electrode current collector 70 (hereinafter referred to as a "reference output"), the output was evaluated as good.

It should be noted that the level of the output of fuel cell 100 serves as an indicator of whether or not the gas (the hydrogen gas and the oxygen gas) is flowing uniformly in metal porous sheet 10 (fuel electrode current collector 30 and oxygen electrode current collector 70).

As shown in Table 1, the output of fuel cell 100 using sample 2 and the output of fuel cell 100 using sample 14 were less than or equal to 1.15 times the reference output. The output of fuel cell 100 using sample 6, the output of fuel cell 100 using sample 7, the output of fuel cell 100 using sample 11, the output of fuel cell 100 using sample 19, and the output of fuel cell 100 using sample 23 were less than or equal to 1.15 times the reference output.

The outputs of fuel cells 100 using the samples other than samples 1, 2, 6, 7, 11, 14, 19, and 23 were more than 1.15 times the reference output. It has become clear from this comparison that uniformity of flow of the gas in metal porous sheet 10 can be improved while decreasing the pressure loss, by setting the ratio of depth D to thickness T to more than or equal to 10 percent and less than or equal to 90 percent, and setting the trench ratio to more than or equal to 10 percent and less than or equal to 90 percent.

The pressure losses in samples 3 to 5, 8 to 10, 12, and 13 were smaller than the pressure losses in samples 15 to 17, 20 to 22, 24, and 25, respectively. It has become clear from this comparison that the pressure loss can be further decreased by arranging metal porous sheet 10 (fuel electrode current collector 30 and oxygen electrode current collector 70) such that trenches 10c are parallel to the direction in which the gas (the hydrogen gas and the oxygen gas) is supplied.

The outputs of fuel cells 100 using samples 3 to 5, 8 to 10, 12, and 13 were smaller than the outputs of fuel cells 100 using samples 15 to 17, 20 to 22, 24, and 25, respectively. It has become clear from this comparison that uniformity of flow of the gas in metal porous sheet 10 (fuel electrode current collector 30 and oxygen electrode current collector 70) can be further improved by arranging metal porous sheet 10 (fuel electrode current collector 30 and oxygen electrode current collector 70) such that trenches 10c intersect the direction in which the gas (the hydrogen gas and the oxygen gas) is supplied.

TABLE 1

|  | Trench Direction | Depth D (μm) | Thickness T (μm) | Depth D/Thickness T (%) | Width W (mm) | Pitch P (mm) | Trench Ratio (%) | Pressure Loss (relative value) | Output (mW/cm$^2$) |
|---|---|---|---|---|---|---|---|---|---|
| Sample 1 | — | — | 500 | — | — | — | — | 100 | 300 |
| Sample 2 | Parallel to | 40 |  | 8 | 25 | 25 | 50 | 80 | 310 |
| Sample 3 | Gas Supply | 50 |  | 10 | 25 | 25 | 50 | 65 | 380 |
| Sample 4 | Direction | 150 |  | 30 | 25 | 25 | 50 | 30 | 420 |
| Sample 5 |  | 450 |  | 90 | 25 | 25 | 50 | 7 | 350 |
| Sample 6 |  | 480 |  | 96 | 25 | 25 | 50 | 5 | 320 |
| Sample 7 |  | 300 |  | 60 | 25 | 280 | 8 | 70 | 330 |
| Sample 8 |  | 300 |  | 60 | 25 | 225 | 10 | 50 | 350 |
| Sample 9 |  | 300 |  | 60 | 25 | 58 | 30 | 20 | 420 |
| Sample 10 |  | 300 |  | 60 | 25 | 4 | 85 | 7 | 360 |
| Sample 11 |  | 300 |  | 60 | 25 | 2.5 | 91 | 2 | 320 |
| Sample 12 |  | 300 |  | 60 | 5 | 5 | 50 | 9 | 370 |

TABLE 1-continued

|  | Trench Direction | Depth D (μm) | Thickness T (μm) | Depth D/Thickness T (%) | Width W (mm) | Pitch P (mm) | Trench Ratio (%) | Pressure Loss (relative value) | Output (mW/cm$^2$) |
|---|---|---|---|---|---|---|---|---|---|
| Sample 13 |  | 300 |  | 60 | 50 | 50 | 50 | 9 | 370 |
| Sample 14 | Orthogonal | 40 |  | 8 | 25 | 25 | 50 | 85 | 320 |
| Sample 15 | to Gas | 50 |  | 10 | 25 | 25 | 50 | 74 | 385 |
| Sample 16 | Supply | 150 |  | 30 | 25 | 25 | 50 | 70 | 430 |
| Sample 17 | Direction | 450 |  | 90 | 25 | 25 | 50 | 32 | 360 |
| Sample 18 |  | 480 |  | 96 | 25 | 25 | 50 | 23 | 345 |
| Sample 19 |  | 300 |  | 60 | 25 | 280 | 8 | 92 | 300 |
| Sample 20 |  | 300 |  | 60 | 25 | 225 | 10 | 79 | 350 |
| Sample 21 |  | 300 |  | 60 | 25 | 58 | 30 | 66 | 430 |
| Sample 22 |  | 300 |  | 60 | 25 | 4 | 85 | 16 | 450 |
| Sample 23 |  | 300 |  | 60 | 25 | 2.5 | 91 | 10 | 345 |
| Sample 24 |  | 300 |  | 60 | 5 | 5 | 50 | 55 | 440 |
| Sample 25 |  | 300 |  | 60 | 50 | 50 | 50 | 55 | 440 |

Effect of Metal Porous Sheet, Fuel Cell, and Water Electrolysis Device in Accordance with First Embodiment The effect of metal porous sheet 10 and fuel cell 100 will be described below.

The metal porous body constituting metal porous sheet 10 has a high deformability, because it is formed of skeleton 11 with a three-dimensional network structure. Accordingly, trenches 10c can be easily formed by pressing the metal mold against first main surface 10a and transferring the shape of the protrusions of the metal mold thereon. Thus, according to metal porous sheet 10, manufacturing cost can be decreased.

In metal porous sheet 10, since depth D is more than or equal to 10 percent of thickness T and the trench ratio is more than or equal to 10 percent, the pressure loss when the gas passes through metal porous sheet 10 can be decreased.

By setting depth D to more than or equal to 30 percent of thickness T in metal porous sheet 10, the pressure loss when the gas passes through metal porous sheet 10 can be further decreased. By setting the trench ratio to more than or equal to 30 percent in metal porous sheet 10, the pressure loss when the gas passes through metal porous sheet 10 can be further decreased.

By setting depth D to less than or equal to 90 percent of thickness T in metal porous sheet 10, uniformity of flow of the gas in metal porous sheet 10 can be improved. By setting the trench ratio to less than or equal to 90 percent in metal porous sheet 10, uniformity of flow of the gas in metal porous sheet 10 can be improved.

By arranging metal porous sheet 10 (fuel electrode current collector 30 and oxygen electrode current collector 70) such that trenches 10c intersect the direction in which the gas (the hydrogen gas and the oxygen gas) is supplied in fuel cell 100, uniformity of flow of the gas in metal porous sheet 10 (fuel electrode current collector 30 and oxygen electrode current collector 70) can be further improved.

By arranging metal porous sheet 10 (fuel electrode current collector 30 and oxygen electrode current collector 70) such that trenches 10c are parallel to the direction in which the gas (the hydrogen gas and the oxygen gas) is supplied in fuel cell 100, the pressure loss when the gas (the hydrogen gas and the oxygen gas) passes through metal porous sheet 10 (fuel electrode current collector 30 and oxygen electrode current collector 70) can be further decreased.

Water electrolysis device 200 uses the metal porous sheet as hydrogen generation electrode 120 and oxygen generation electrode 140, and thereby can improve uniformity of flow of the alkaline aqueous solution in hydrogen generation electrode 120 and oxygen generation electrode 140, and can decrease the pressure loss when the alkaline aqueous solution passes through hydrogen generation electrode 120 and oxygen generation electrode 140. As a result, water electrolysis device 200 can decrease a voltage applied between hydrogen generation electrode 120 and oxygen generation electrode 140 when it generates the hydrogen gas and the oxygen gas.

Variations in Cross Sectional Shape of Trenches

Figure 11A:
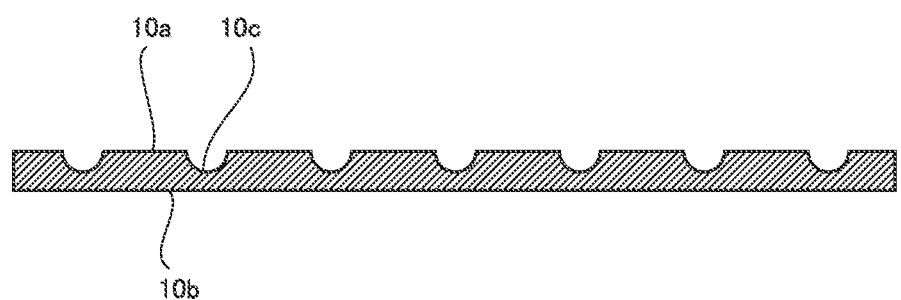
FIG. 11A is a cross sectional view of metal porous sheet 10 in accordance with a first variation.
Figure 11B:
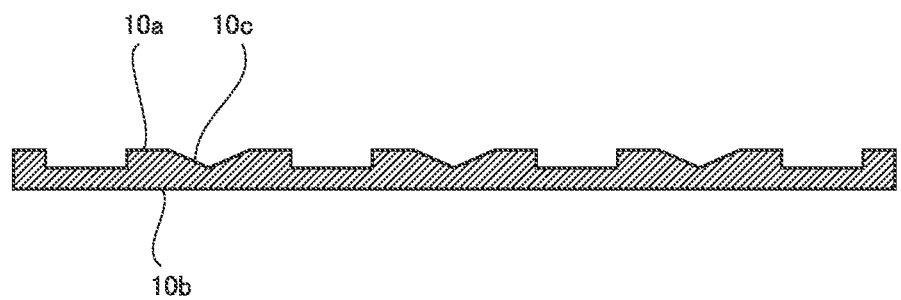
FIG. 11B is a cross sectional view of metal porous sheet 10 in accordance with a second variation.

FIG. 11A is a cross sectional view of metal porous sheet 10 in accordance with a first variation. As shown in FIG. 11A, the cross sectional shape of trenches 10c is not limited to a rectangular shape. The cross sectional shape of trenches 10c may be a semicircular shape (see FIG. 11A). FIG. 11B is a cross sectional view of metal porous sheet 10 in accordance with a second variation. As shown in FIG. 11B, two trenches 10c arranged adjacent to each other may have different cross sectional shapes.

Variations in Planar Shape of Trenches

Figure 12A:
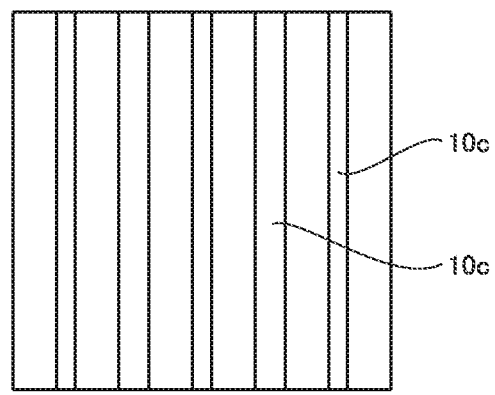
FIG. 12A is a plan view of metal porous sheet 10 in accordance with a third variation.

FIG. 12A is a plan view of metal porous sheet 10 in accordance with a third variation. As shown in FIG. 12A, two trenches 10c arranged adjacent to each other may have different widths W.

Figure 12B:
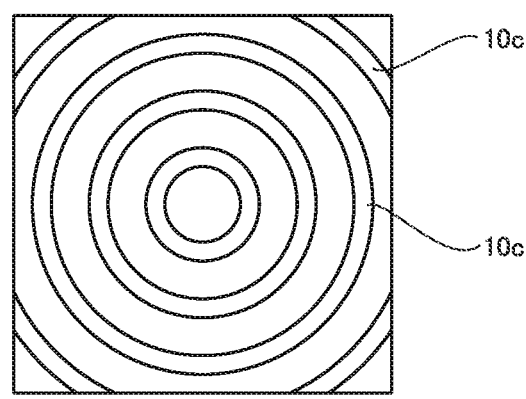
FIG. 12B is a plan view of metal porous sheet 10 in accordance with a fourth variation.
Figure 12C:
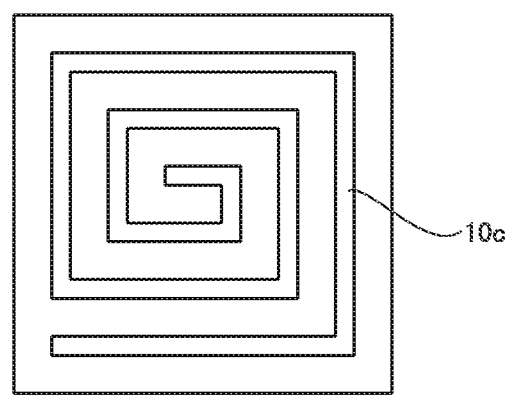
FIG. 12C is a plan view of metal porous sheet 10 in accordance with a fifth variation.

FIG. 12B is a plan view of metal porous sheet 10 in accordance with a fourth variation. As shown in FIG. 12B, trenches 10c may be concentrically formed. FIG.

12C is a plan view of metal porous sheet 10 in accordance with a fifth variation. Trench 10c may be spirally formed.

Figure 12D:
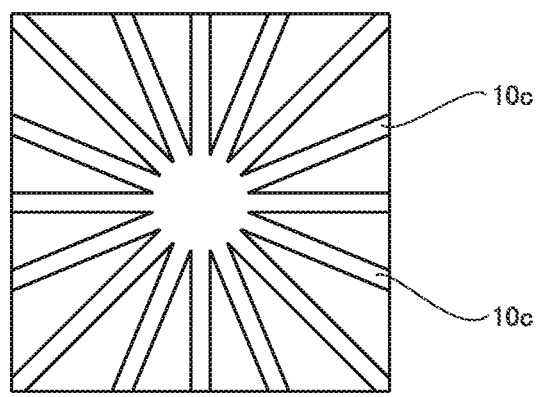
FIG. 12D is a plan view of metal porous sheet 10 in accordance with a sixth variation.
Figure 12E:
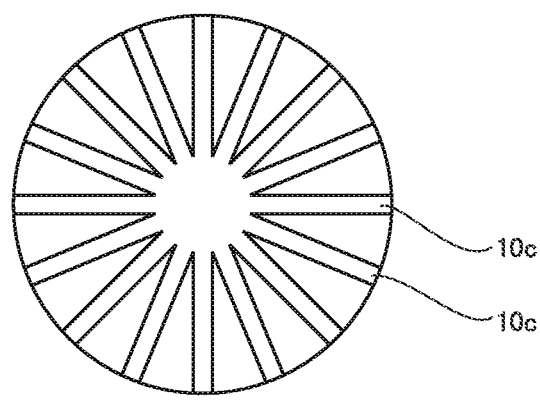
FIG. 12E is a plan view of metal porous sheet 10 in accordance with a seventh variation.

FIG. 12D is a plan view of metal porous sheet 10 in accordance with a sixth variation. FIG. 12E is a plan view of metal porous sheet 10 in accordance with a seventh variation. As shown in FIGS. 12D and 12E, trenches 10c may be radially formed. As shown in FIG. 12E, metal porous sheet 10 may have a shape other than a rectangular shape in a plan view. Specifically, metal porous sheet 10 may have a circular shape in a plan view.

Configuration of Metal Porous Sheet in Accordance with Second Embodiment

A configuration of a metal porous sheet in accordance with a second embodiment (hereinafter referred to as a "metal porous sheet 10A") will be described below. Here, the difference from the configuration of metal porous sheet 10 will be mainly described, and redundant description will not be repeated.

Figure 13:
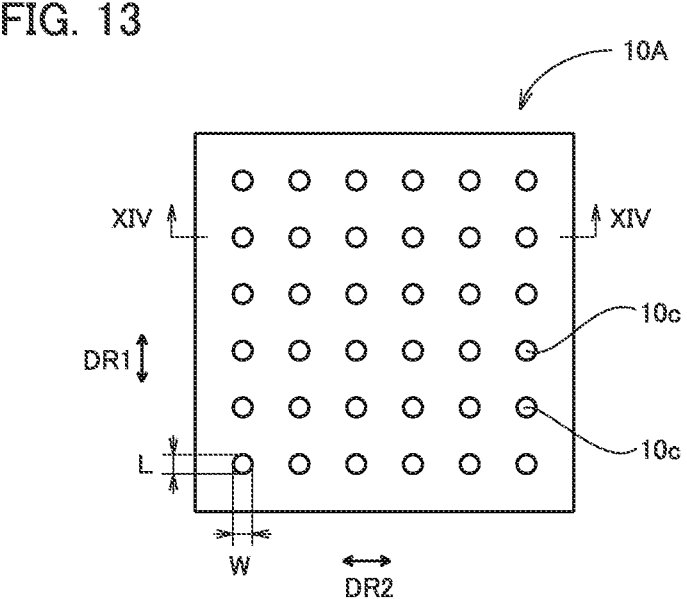
FIG. 13 is a plan view of a metal porous sheet 10A.
Figure 14:
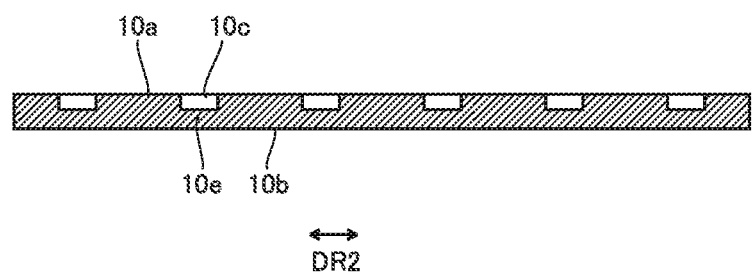
FIG. 14 is a cross sectional view along XIV-XIV in FIG. 13.

FIG. 13 is a plan view of metal porous sheet 10A. FIG. 14 is a cross sectional view along XIV-XIV in FIG. 13. As shown in FIGS. 13 and 14, trenches 10c are each a hole having a bottom portion 10e with a circular shape in a plan view. Trenches 10c are arranged in a lattice shape (more specifically, a square lattice shape) in a plan view. From another viewpoint, trenches 10c are arranged to form a plurality of columns extending along first direction DR1. The configuration of metal porous sheet 10A is different from the configuration of metal porous sheet 10 with regard to trenches 10c. It should be noted that, as is clear from the description that trenches 10c each include a bottomed hole with a circular shape in a plan view, a length L of trench 10c to width W (see FIG. 13, the length of trench 10c in a direction orthogonal to the direction of width W) is not particularly limited.

Water Electrolysis Device in Accordance with Second Embodiment

A configuration of a water electrolysis device in accordance with the second embodiment (hereinafter referred to as a "water electrolysis device 300") will be described below.

Figure 15:
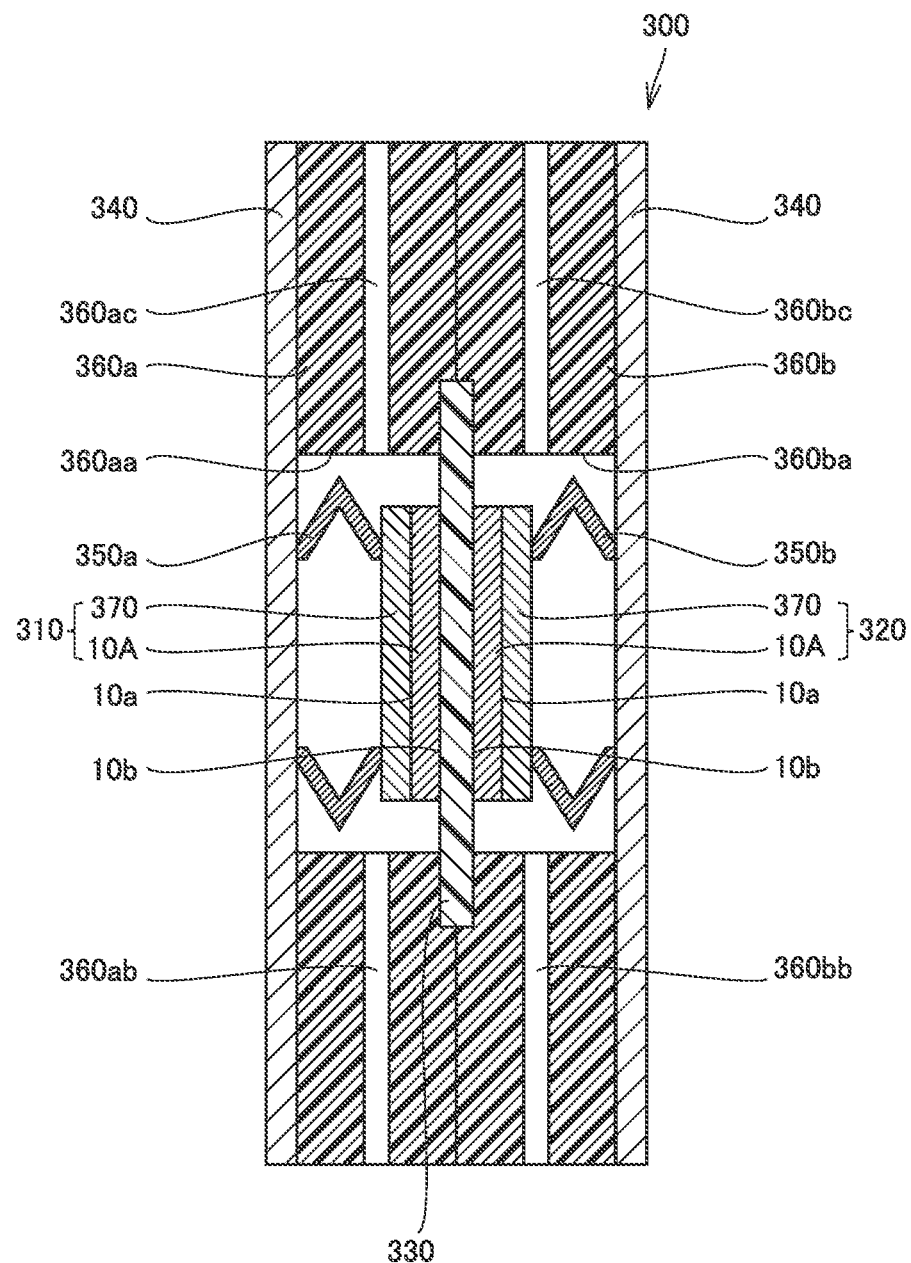
FIG. 15 is a schematic cross sectional view of a unit cell of a water electrolysis device 300.

FIG. 15 is a schematic cross sectional view of a unit cell of water electrolysis device 300. The upper and lower sides in FIG. 15 correspond to a vertically upper side and a vertically lower side, respectively. As shown in FIG. 15, the unit cell of water electrolysis device 300 has a hydrogen generation electrode 310 and an oxygen generation electrode 320, a diaphragm 330, bipolar plates 340, a plate spring 350a and a plate spring 350b, and a frame 360a and a frame 360b. Water electrolysis device 300 is constituted by arranging a plurality of the unit cells.

Hydrogen generation electrode 310 and oxygen generation electrode 320 each have metal porous sheet 10A and a support 370. Diaphragm 330 is sandwiched between hydrogen generation electrode 310 and oxygen generation electrode 320. Diaphragm 330 is a membrane that allows hydroxide ions (or hydrogen ions) to permeate therethrough. Second main surface 10b of metal porous sheet 10A included in hydrogen generation electrode 310 and second main surface 10b of metal porous sheet 10A included in oxygen generation electrode 320 face diaphragm 330. Metal porous sheet 10A included in hydrogen generation electrode 310 and metal porous sheet 10A included in oxygen generation electrode 320 are arranged such that first direction DR1 extends along a vertical direction.

Supports 370 are each an expanded metal, for example. In each support 370, openings penetrating support 370 along a thickness direction are formed. Supports 370 are arranged on first main surface 10a of metal porous sheet 10A included in hydrogen generation electrode 310 and on first main surface 10a of metal porous sheet 10A included in oxygen generation electrode 320. Trenches 10c are exposed from the openings in supports 370.

An opening portion 360aa is formed in frame 360a. Opening portion 360aa penetrates frame 360a along the thickness direction. A hole 360ab and a hole 360ac are formed in frame 360a. Hole 360ab extends from opening portion 360aa toward the vertically lower side to connect opening portion 360aa with the outside of frame 360a. Hole 360ac extends from opening portion 360aa toward the vertically upper side to connect opening portion 360aa with the outside of frame 360a.

An opening portion 360ba is formed in frame 360b. Opening portion 360ba penetrates frame 360b along the thickness direction. A hole 360bb and a hole 360bc are formed in frame 360b. Hole 360bb extends from opening portion 360ba toward the vertically lower side to connect opening portion 360ba with the outside of frame 360b. Hole 360ac extends from opening portion 360ba toward the vertically upper side to connect opening portion 360ba with the outside of frame 360b.

Frame 360a and frame 360b are arranged such that opening portion 360aa and opening portion 360ba overlap with each other. Diaphragm 330 is sandwiched between frame 360a and frame 360b to be exposed from opening portion 360aa and opening portion 360ba.

Frame 360a and frame 360b are sandwiched between two bipolar plates 340. Bipolar plate 340 electrically connects adjacent unit cells. Although not shown, bipolar plate 340 is electrically connected to a power supply at a termination portion of water electrolysis device 300. Bipolar plate 340 is arranged to face support 370 included in hydrogen generation electrode 310 (oxygen generation electrode 320).

Hydrogen generation electrode 310 is arranged in a space defined by diaphragm 330, bipolar plate 340, and opening portion 360aa. Oxygen generation electrode 320 is arranged in a space defined by diaphragm 330, bipolar plate 340, and opening portion 360ba.

Plate spring 350a is arranged between bipolar plate 340 and support 370 included in hydrogen generation electrode 310. Plate spring 350b is arranged between bipolar plate 340 and support 370 included in oxygen generation electrode 320. As a result, metal porous sheet 10A included in hydrogen generation electrode 310 and metal porous sheet 10A included in oxygen generation electrode 320 are pressed against diaphragm 330.

An alkaline aqueous solution is supplied from hole 360ab into the space defined by diaphragm 330, bipolar plate 340, and opening portion 360aa. The alkaline aqueous solution is supplied from hole 360bb into the space defined by diaphragm 330, bipolar plate 340, and opening portion 360ba. Thereby, the space defined by diaphragm 330, bipolar plate 340, and opening portion 360aa and the space defined by diaphragm 330, bipolar plate 340, and opening portion 360ba are filled with the alkaline aqueous solution as an electrolyte solution. This alkaline aqueous solution is an aqueous solution of potassium hydroxide, for example.

When water electrolysis device 300 is operated, a voltage is applied between bipolar plates 340 at both ends of the unit cell such that an electric potential in hydrogen generation electrode 310 becomes lower than an electric potential in oxygen generation electrode 320. Thereby, in hydrogen generation electrode 310, water in the alkaline aqueous solution is reduced, and hydrogen gas is generated. The hydrogen gas generated in hydrogen generation electrode 310 is exhausted from the space defined by diaphragm 330, bipolar plate 340, and opening portion 360aa, through hole 360ac, together with the alkaline aqueous solution. Further, on this occasion, hydroxide ions in the alkaline aqueous solution move from the hydrogen generation electrode 310 side to the oxygen generation electrode 320 side, through diaphragm 330.

The hydroxide ions that have moved to the oxygen generation electrode 320 side are oxidized in oxygen generation electrode 320. Thereby, oxygen gas is generated in oxygen generation electrode 320. The oxygen gas generated in oxygen generation electrode 320 is exhausted from the space defined by diaphragm 330, bipolar plate 340, and opening portion 360ba, through hole 360bc, together with the alkaline aqueous solution. By continuing such a reaction, water electrolysis device 300 generates the hydrogen gas and the oxygen gas.

Effect of Metal Porous Sheet and Water Electrolysis Device in Accordance with Second Embodiment The effect of metal porous sheet 10A and water electrolysis device 300 will be described below.

Figure 16:
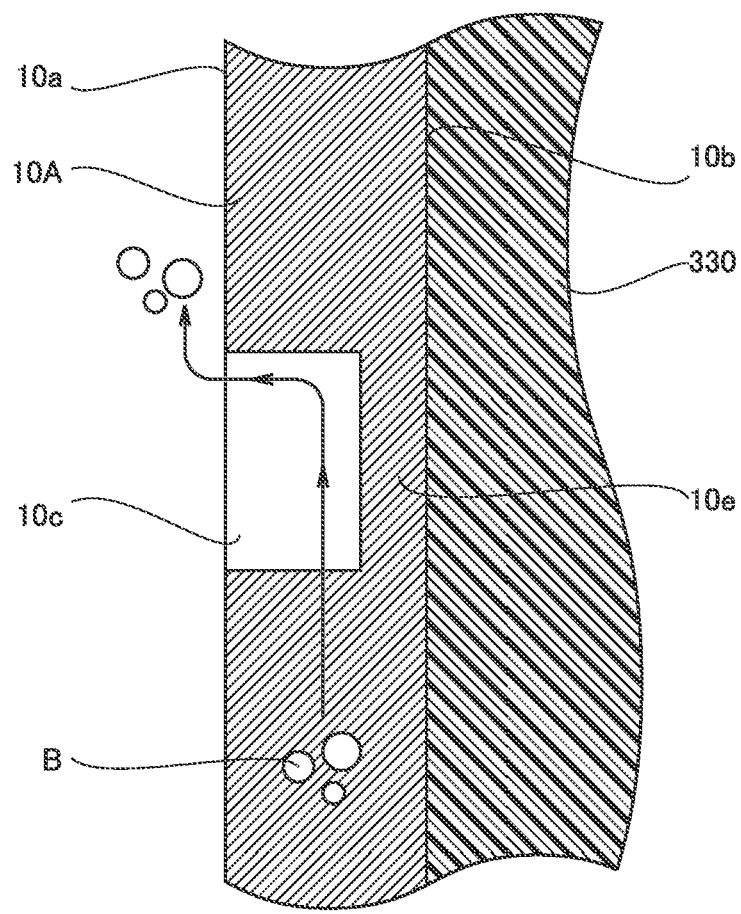
FIG. 16 is a schematic view for explaining the effect of water electrolysis device 300 using metal porous sheet 10A.

FIG. 16 is a schematic view for explaining the effect of water electrolysis device 300 using metal porous sheet 10A. As shown in FIG. 16, inside metal porous sheet 10A included in hydrogen generation electrode 310 (oxygen generation electrode 320), hydrogen gas (oxygen gas) is generated in association with electrolysis of the electrolyte solution. This hydrogen gas (oxygen gas) turns into bubbles B.

Bubbles B move toward the vertically upper side by the action of buoyancy, and reach trench 10c. Bubbles B that have reached trench 10c are released to the outside of metal porous sheet 10A through trench 10c. In metal porous sheet 10A, since bubbles B are easily released to the outside of metal porous sheet 10A, generated bubbles B are less likely to interfere with the reaction in hydrogen generation electrode 310 (oxygen generation electrode 320). By applying metal porous sheet 10A to water electrolysis device 300 as described above, an electrolysis voltage when water electrolysis is performed can be decreased. In addition, since bottom portion 10e is located on the second main surface 10b side of trench 10c, bubbles B that have reached trench 10c are less likely to be released from the second main surface 10b side. Accordingly, by applying metal porous sheet 10A to water electrolysis device 300, accumulation of bubbles B in the vicinity of diaphragm 330 can be suppressed.

It should be noted that, although metal porous sheet 10A is applied to water electrolysis device 300 in the above description, metal porous sheet 10 may be applied to water electrolysis device 300. In addition, although metal porous sheet 10A is applied to water electrolysis device 300 in the above description, metal porous sheet 10A may be applied to fuel cell 100 or water electrolysis device 200.

Variation

Figure 17:
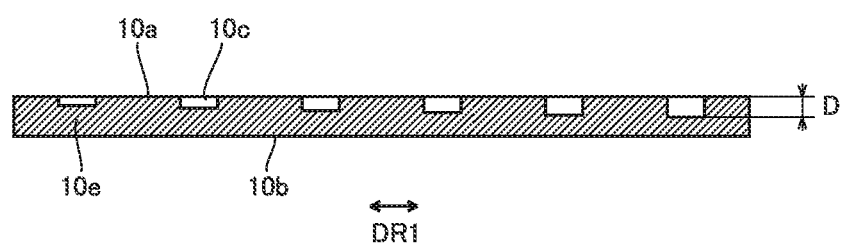
FIG. 17 is a cross sectional view of metal porous sheet 10A in accordance with a variation.

FIG. 17 is a cross sectional view of metal porous sheet 10A in accordance with a variation. As shown in FIG. 17, depths D of trenches 10c may increase from one side in first direction DR1 (the left side in the drawing) toward the other side in first direction DR1 (the right side in the drawing). When metal porous sheet 10A in accordance with the variation is applied to water electrolysis device 300, metal porous sheet 10A is preferably arranged such that the one side in first direction DR1 corresponds to the vertically lower side, and the other side in the first direction DR1 corresponds to the vertically upper side. Thereby, trench 10c located more upward in the vertical direction has a deeper depth D, and thus bubbles B are further easily released to the outside of metal porous sheet 10A.

Third Embodiment, Fourth Embodiment, and Fifth Embodiment

A metal porous sheet in accordance with a third embodiment, a metal porous sheet in accordance with a fourth embodiment, and a metal porous sheet in accordance with a fifth embodiment (hereinafter referred to as a "metal porous sheet 10B", a "metal porous sheet 10C", and a "metal porous sheet 10D", respectively) will be described below. Here, the difference from metal porous sheet 10 will be mainly described, and redundant description will not be repeated.

Figure 18:
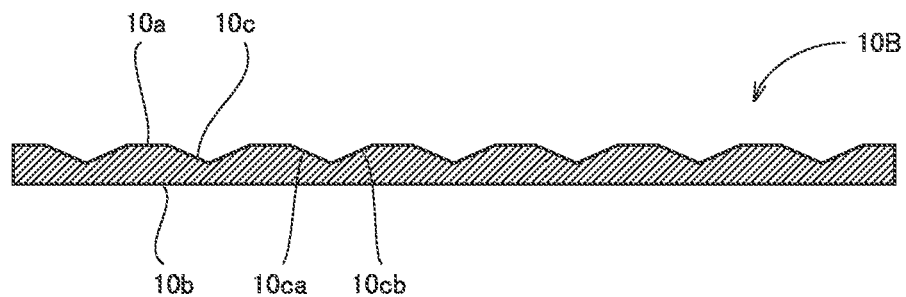
FIG. 18 is a cross sectional view of a metal porous sheet 10B.

FIG. 18 is a cross sectional view of metal porous sheet 10B. As shown in FIG. 18, in metal porous sheet 10B, the cross sectional shape of trenches 10c is a triangular shape. In metal porous sheet 10B, the distance between side surface 10ca and side surface 10cb decreases from the first main surface 10a side toward the second main surface 10b side. It should be noted that, in metal porous sheet 10B, width W is the distance between side surface 10ca and side surface 10cb in first main surface 10a.

Figure 19:
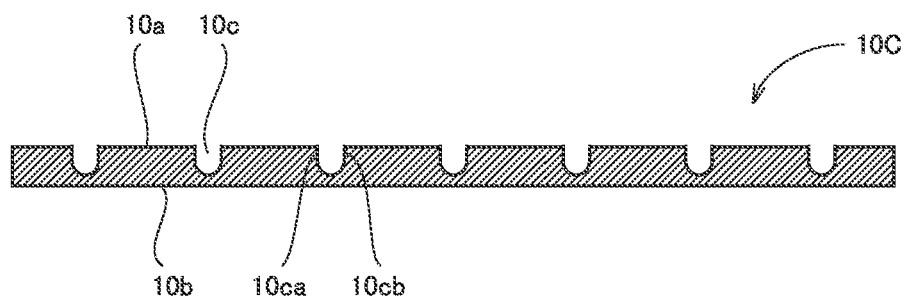
FIG. 19 is a cross sectional view of a metal porous sheet 10C.

FIG. 19 is a cross sectional view of metal porous sheet 10C. As shown in FIG. 19, in metal porous sheet 10C, the bottom surface of trenches 10c is constituted by a curve that protrudes toward the second main surface 10b side. This curve is a semicircle, for example.

Figure 20:
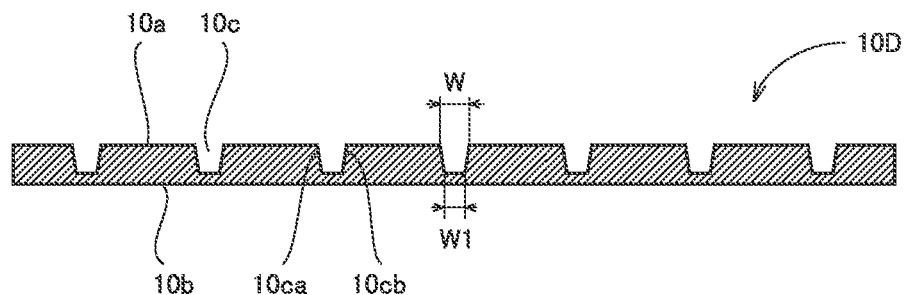
FIG. 20 is a cross sectional view of a metal porous sheet 10D.

FIG. 20 is a cross sectional view of metal porous sheet 10D. As shown in FIG. 20, in metal porous sheet 10D, the distance between side surface 10ca and side surface 10cb decreases from the first main surface 10a side toward the second main surface 10b side. In metal porous sheet 10D, width W is the distance between side surface 10ca and side surface 10cb in first main surface 10a. A distance between side surface 10ca and side surface 10cb on the lowermost bottom surface side is herein referred to as a width W1. Width W1 is smaller than width W.

Sixth Embodiment

A metal porous sheet in accordance with a sixth embodiment (hereinafter referred to as a "metal porous sheet 10E") will be described below. Here, the difference from metal porous sheet 10 will be mainly described, and redundant description will not be repeated.

Figure 21:
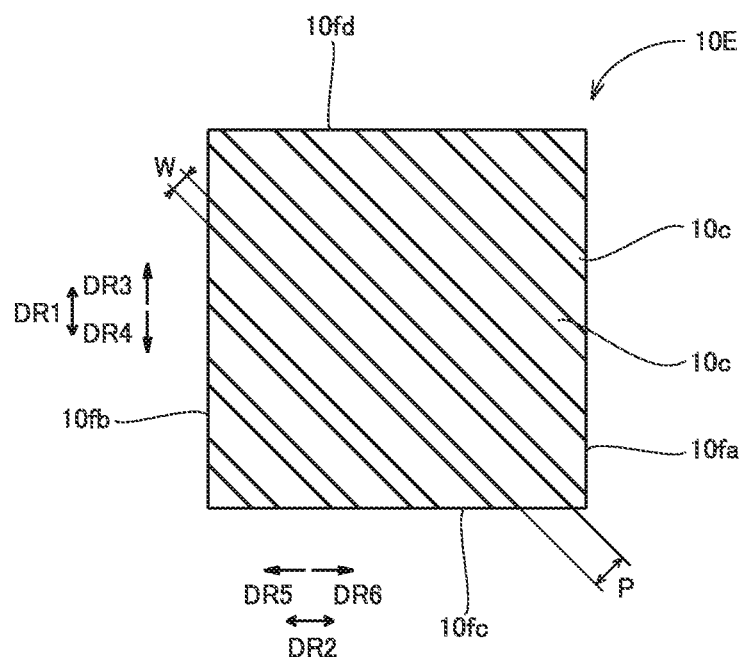
FIG. 21 is a plan view of a metal porous sheet 10E.

FIG. 21 is a plan view of metal porous sheet 10E. As shown in FIG. 21, trenches 10c extend to be inclined with respect to sides constituting first main surface 10a. The sides constituting first main surface 10a are herein referred to as a first side 10fa, a second side 10fb, a third side 10fc, and a fourth side 10fd. First side 10fa and second side 10fb extend along first direction DR1. The third side and fourth side 10fd extend along second direction DR2.

A direction from third side 10fc toward fourth side 10fd is herein referred to as a third direction DR3, and a direction from fourth side 10fd toward third side 10fc is herein referred to as a fourth direction DR4. A direction from first side 10fa toward second side 10fb is herein referred to as a fifth direction DR5, and a direction from second side 10fb toward first side 10fa is herein referred to as a sixth direction DR6. Trenches 10c are inclined to come closer to third side 10fc with distance from second side 10fb (inclined to come closer to fourth side 10fd with distance from first side 10fa).

Seventh Embodiment

A metal porous sheet in accordance with a seventh embodiment (hereinafter referred to as a "metal porous sheet 10F") will be described below. Here, the difference from metal porous sheet 10 will be mainly described, and redundant description will not be repeated.

Figure 22:
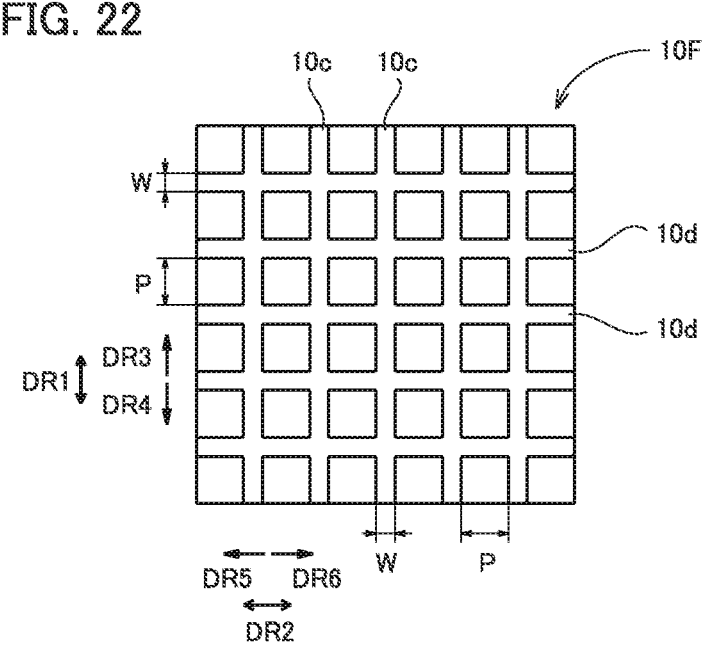
FIG. 22 is a plan view of a metal porous sheet 10F.

FIG. 22 is a plan view of metal porous sheet 10F. As shown in FIG. 22, trenches 10d are further formed in first main surface 10a of metal porous sheet 10F. Trenches 10d extend along a direction orthogonal to trenches 10c. Trenches 10d have a pitch equal to pitch P. Trenches 10d have a width equal to width W.

Eighth Embodiment

A metal porous sheet in accordance with an eighth embodiment (hereinafter referred to as a "metal porous sheet 10G") will be described below. Here, the difference from metal porous sheet 10 will be mainly described, and redundant description will not be repeated.

Figure 23:
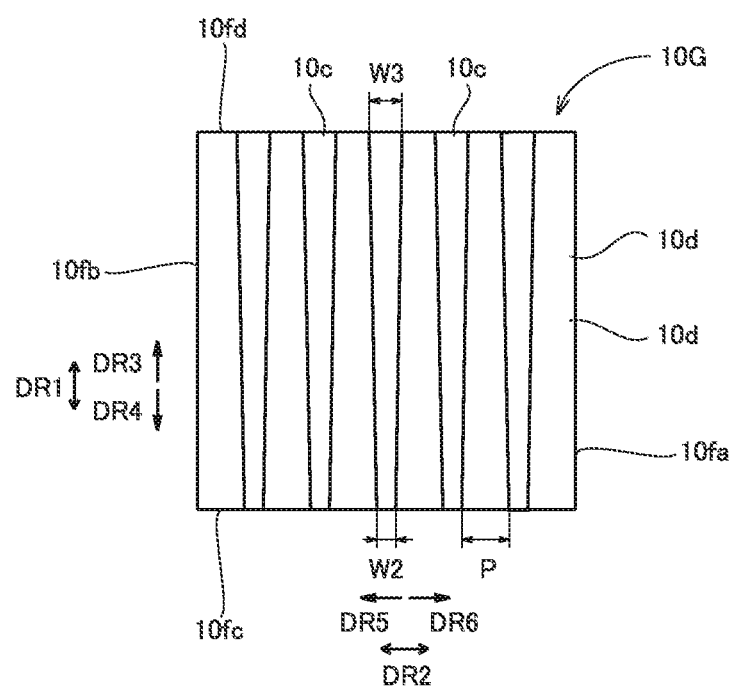
FIG. 23 is a plan view of a metal porous sheet 10G.

FIG. 23 is a plan view of metal porous sheet 10G. As shown in FIG. 23, width W increases from the third side 10fc side toward the fourth side 10fd side. Width W at third side 10fc is herein referred to as a width W2, and width W at fourth side 10fd is herein referred to as a width W3. Width W3 is larger than width W2. Depth D of each trench 10c may decrease from the third side 10fc side toward the fourth side 10fd side. Depth D at third side 10fc is herein referred to as a depth D1, and a depth at fourth side 10fd is herein referred to as a depth D2. Depth D2 may be larger than depth D1.

Ninth Embodiment

A metal porous sheet in accordance with a ninth embodiment (hereinafter referred to as a "metal porous sheet 10H") will be described below. Here, the difference from metal porous sheet 10 will be mainly described, and redundant description will not be repeated.

Figure 24:
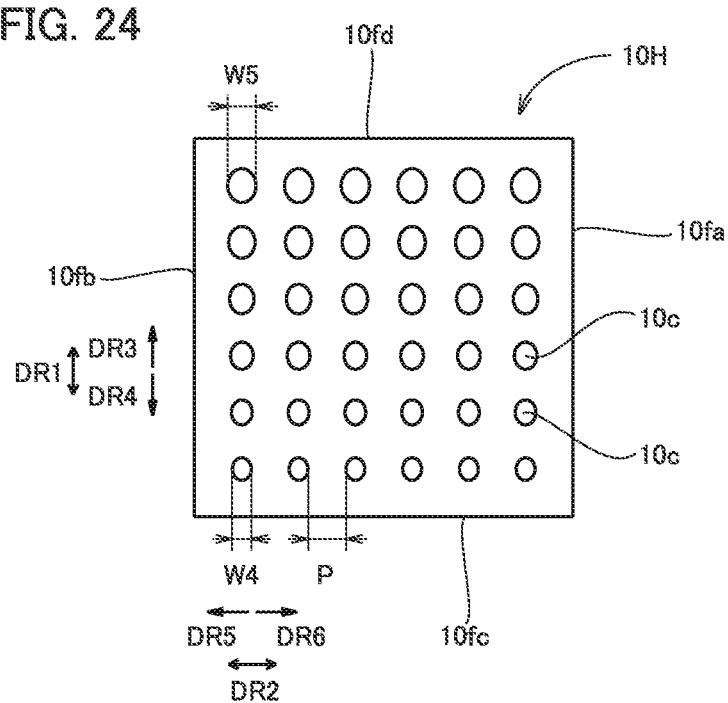
FIG. 24 is a plan view of a metal porous sheet 10H.

FIG. 24 is a plan view of metal porous sheet 10H. As shown in FIG. 24, in metal porous sheet 10H, trenches 10c are each a bottomed hole with an elliptical shape in a plan view. The major axis of this elliptical shape extends along first direction DR1. Trenches 10c are arranged in a lattice shape (specifically, a square lattice shape) in a plan view.

Trenches 10c are arranged to form a plurality of columns extending along first direction DR1. Widths W of a plurality of trenches 10c included in each of the columns extending along first direction DR1 increase with increasing proximity to fourth side 10fd. Width W of trench 10c arranged closest to third side 10fc, of the plurality of trenches 10c included in each of the columns extending along first direction DR1, is herein referred to as a width W4, and width W of trench 10c arranged closest to fourth side 10fd, of the plurality of trenches 10c included in each of the columns extending along first direction DR1, is herein referred to as a width W5. Width W5 is larger than width W4.

Depths D of the plurality of trenches 10c included in each of the columns extending along first direction DR1 decrease with increasing proximity to fourth side 10fd. Depth D of trench 10c arranged closest to third side 10fc, of the plurality of trenches 10c included in each of the columns extending along first direction DR1, is herein referred to as a depth D3, and depth D of trench 10c arranged closest to fourth side 10fd, of the plurality of trenches 10c included in each of the columns extending along first direction DR1, is herein referred to as a depth D4. Depth D4 may be larger than depth D3.

Tenth Embodiment

A metal porous sheet in accordance with a tenth embodiment (hereinafter referred to as a "metal porous sheet 10I") will be described below. Here, the difference from metal porous sheet 10E will be mainly described, and redundant description will not be repeated.

Figure 25:
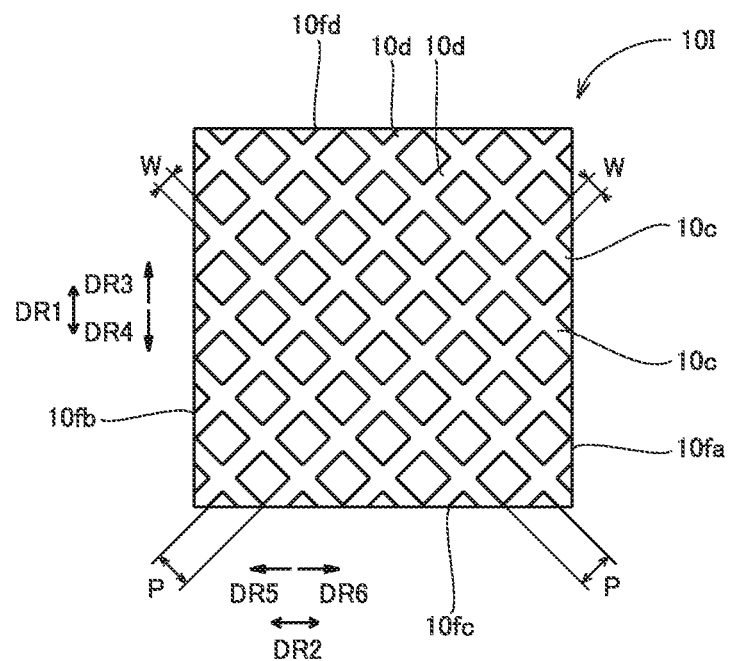
FIG. 25 is a plan view of a metal porous sheet 10I.

FIG. 25 is a plan view of metal porous sheet 10I. As shown in FIG. 25, trenches 10d are further formed in first main surface 10a of metal porous sheet 10I. Trenches 10d extend along a direction orthogonal to trenches 10c. Trenches 10d have a pitch equal to pitch P. Trenches 10d have a width equal to width W.

Eleventh Embodiment

A metal porous sheet in accordance with an eleventh embodiment (hereinafter referred to as a "metal porous sheet 10J") will be described below. Here, the difference from metal porous sheet 10 will be mainly described, and redundant description will not be repeated.

Figure 26:
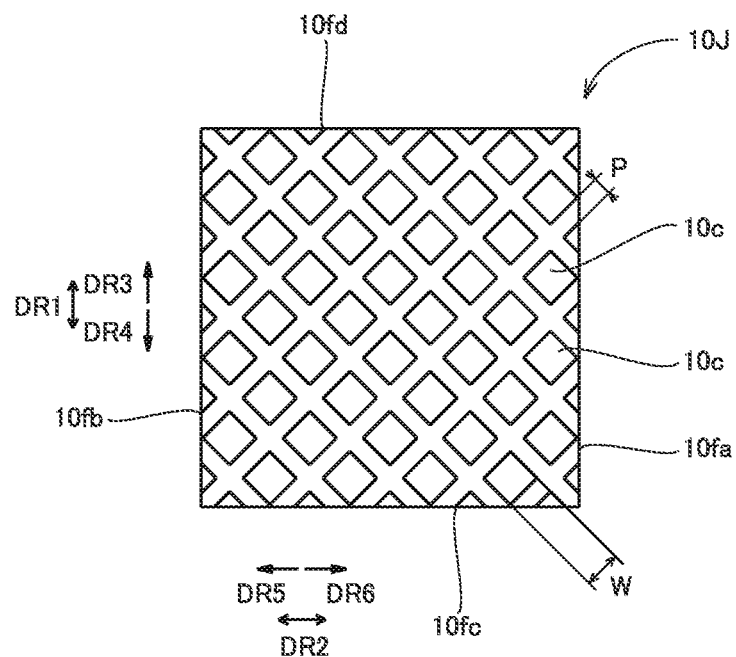
FIG. 26 is a plan view of a metal porous sheet 10J.

FIG. 26 is a plan view of metal porous sheet 10J. As shown in FIG. 26, in metal porous sheet 10J, trenches 10c are each a bottomed hole with a square shape in a plan view. Diagonal lines of the square shape extend along first direction DR1 and second direction DR2, respectively. Trenches 10c are arranged in a lattice shape (specifically, a staggered lattice shape) in a plan view. From another viewpoint, the structure of metal porous sheet 10J is obtained by inverting positions where trenches 10c and trenches 10d are formed and positions where trenches 10c and trenches 10d are not formed in metal porous sheet 10I. It should be noted that, in metal porous sheet 10J, width W is a distance between opposite sides of the square shape.

Twelfth Embodiment

A metal porous sheet in accordance with a twelfth embodiment (hereinafter referred to as a "metal porous sheet 10K") will be described below. Here, the difference from metal porous sheet 10I will be mainly described, and redundant description will not be repeated.

Figure 27:
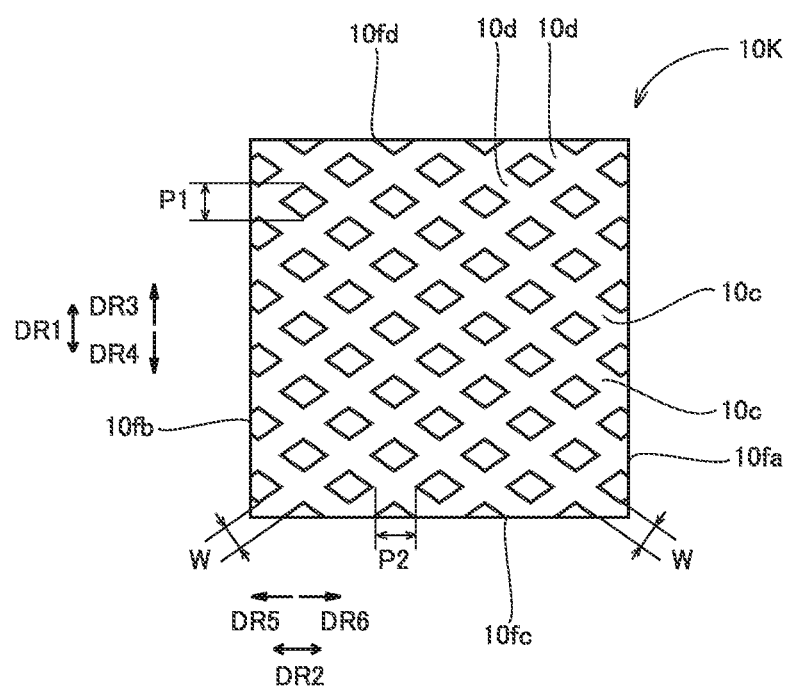
FIG. 27 is a plan view of a metal porous sheet 10K.

FIG. 27 is a plan view of metal porous sheet 10K. As shown in FIG. 27, in metal porous sheet 10K, trenches 10c and trenches 10d intersect each other but are not orthogonal to each other. A distance in first direction DR1 between two adjacent trenches 10c (trenches 10d) is herein referred to as a pitch P1. A distance in second direction DR2 between two adjacent trenches 10c (trenches 10d) is herein referred to as a pitch P2. Pitch P2 is larger than pitch P1.

A metal porous sheet in accordance with a thirteenth embodiment (hereinafter referred to as a "metal porous sheet 10L") will be described below. Here, the difference from metal porous sheet 10 will be mainly described, and redundant description will not be repeated.

Figure 28:
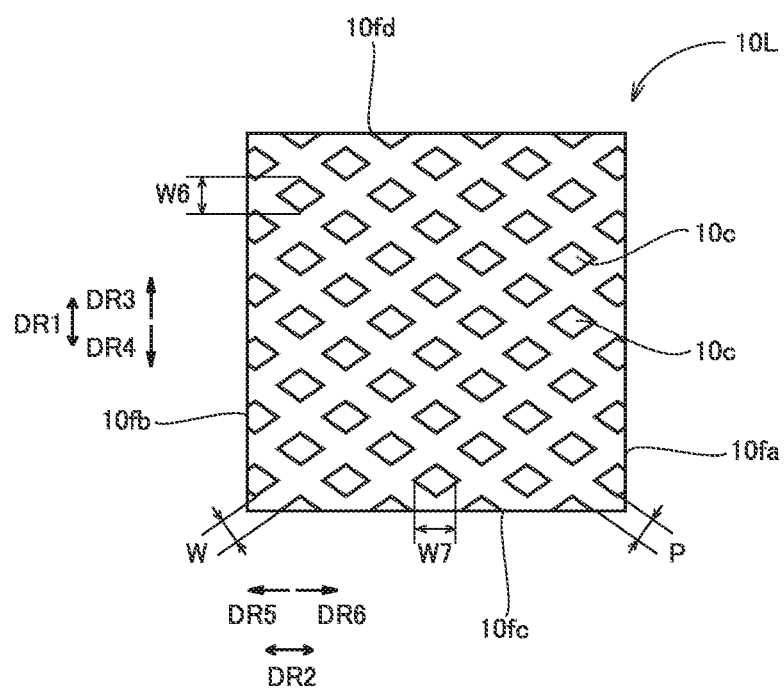
FIG. 28 is a plan view of a metal porous sheet 10L.

FIG. 28 is a plan view of metal porous sheet 10L. As shown in FIG. 28, in metal porous sheet 10L, trenches 10c are each a bottomed hole with a rhombic shape in a plan view. The rhombic shape has a first diagonal line and a second diagonal line longer than the first diagonal line. The first diagonal line and the second diagonal line extend along first direction DR1 and second direction DR2, respectively. Trenches 10c are arranged in a lattice shape (specifically, a staggered lattice shape) in a plan view. From another viewpoint, the structure of metal porous sheet 10L is obtained by inverting positions where trenches 10c and trenches 10d are formed and positions where trenches 10c and trenches 10d are not formed in metal porous sheet 10K. In metal porous sheet 10L, trenches 10c each have a width W6 and a width W7. Width W6 and width W7 are equal to lengths of the first diagonal line and the second diagonal line, respectively. That is, width W7 is larger than width W6.

EXAMPLES

Examples of metal porous sheets 10A to 10L and fuel cells 100 using these metal porous sheets will be described below. Pressure losses and outputs in the fuel cells using metal porous sheets 10A to 10L were evaluated by the same method as that for fuel cell 100 using metal porous sheet 10.

Tables 2 and 3 show details of samples used for the evaluation of a pressure loss. As shown in Tables 2 and 3, trenches 10c were formed in samples 26 to 58. All samples 26 to 58 had thickness T of 500 μM. Tables 2 and 3 show the trench ratio, the ratio of depth D to thickness T, and other characteristics of the trench shape in each sample. In addition, Tables 2 and 3 show a pressure loss (a relative value compared with the value of sample 1) and an output in each sample.

It should be understood that the embodiments disclosed herein are illustrative and non-restrictive in every respect. The scope of the present invention is defined by the scope of the claims, rather than the embodiments described above, and is intended to include any modifications within the scope and meaning equivalent to the scope of the claims.

REFERENCE SIGNS LIST 10, 10A, 10B, 10C, 10D, 10E, 10F, 10G, 10H, 10I, 10J, 10K, 10L: metal porous sheet; 10a: first main surface; 10b: second main surface; 10c: trench: 10d: trench: 10ca, 10cb: side surface; 10e: bottom portion; 10fa: first side; 10fb: second side; 10fc: third side; 10fd: fourth side; 11: skeleton; 11a: skeleton main body; 11b: internal space; 20: interconnector; 30: fuel electrode current collector; 40: fuel electrode; 50: solid electro-

TABLE 2

| | Gas Supply Direction | Trench Planar Structure | Trench Cross Sectional Shape | Depth D (μm) | Thickness (μm) | Depth D/Thickness T (%) | Width W (mm) | Pitch P (mm) | Trench Ratio (%) | Pressure Loss (relative value) | Output (mW/cm$^2$) |
|---|---|---|---|---|---|---|---|---|---|---|---|
| Sample 26 | First Direction (parallel to trenches) | FIG. 1 | FIG. 2 | 300 | 500 | 60 | 4 | 4 | 50 | 10 | 380 |
| Sample 27 | | | | | | | 2 | | 33 | 22 | 425 |
| Sample 28 | | | | | | | 1 | | 20 | 42 | 420 |
| Sample 29 | | | | | | | 0.6 | | 13 | 60 | 400 |
| Sample 30 | | | FIG. 18 | | | | | | | 68 | 360 |
| Sample 31 | | | FIG. 19 | | | | | | | 63 | 380 |
| Sample 32 | | | FIG. 20 | | | | 0.6 0.3 (W1) | | | 62 | 370 |
| Sample 33 | Second Direction (orthogonal to trenches) | | FIG. 2 | | | | 4 | | 50 | 58 | 440 |
| Sample 34 | | | | | | | 2 | | 33 | 64 | 420 |
| Sample 35 | | | | | | | 1 | | 20 | 69 | 375 |
| Sample 36 | | | | | | | 0.6 | | 13 | 75 | 365 |
| Sample 37 | | | FIG. 18 | | | | | | | 79 | 350 |
| Sample 38 | | | FIG. 19 | | | | | | | 76 | 355 |
| Sample 39 | | | FIG. 20 | | | | 0.6 0.3 (W1) | | | 76 | 355 |

TABLE 3

| | Gas Supply Direction | Trench Planar Structure | Trench Cross Sectional Shape | Depth D (μm) | Thickness T (μm) | Depth D/Thickness T (%) | Width W (mm) | Pitch P (mm) | Trench Ratio (%) | Pressure Loss (relative value) | Output (mW/cm$^2$) |
|---|---|---|---|---|---|---|---|---|---|---|---|
| Sample 40 | Third Direction | FIG. 21 | FIG. 2 | 300 | 500 | 60 | 4 | 4 | 50 | 30 | 365 |
| Sample 41 | | FIG. 13 | | 300 | | | 2 | | 20 | 75 | 360 |
| Sample 42 | | | | 450 | | | 2 | | | 67 | 365 |
| Sample 43 | | | FIG. 20 | 450 | | | 2 1 (W1) | | | 69 | 365 |
| Sample 44 | | FIG. 22 | FIG. 2 | 300 | | | 4 | | 56 | 8 | 380 |
| Sample 45 | | | | 300 | | | 2 | | 36 | 18 | 440 |
| Sample 46 | Fourth Direction | FIG. 23 | | 300 (D1) 300 (D2) | | | 2 (W2) 4 (W3) | 8 | 38 | 17 | 430 |
| Sample 47 | Third Direction | | | | | | | | | 17 | 380 |
| Sample 48 | Fourth Direction | | | 150 (D1) 300 (D2) | | 30-60 | | | | 22 | 440 |
| Sample 49 | | | FIG. 18 | | | | | | | 40 | 440 |
| Sample 50 | | FIG. 24 | FIG. 2 | 300 (D3) 300 (D4) | | 60 | 1 (W4) 2 (W5) | 4 | 12 | 72 | 380 |
| Sample 51 | Third Direction | | | | | | | | | 72 | 360 |
| Sample 52 | Fourth Direction | | | 150 (D3) 300 (D4) | | 30-60 | | | | 77 | 370 |
| Sample 53 | | | FIG. 18 | | | | | | | 79 | 350 |
| Sample 54 | Third Direction | FIG. 25 | FIG. 2 | 300 | | 60 | 2 | | 56 | 11 | 420 |
| Sample 55 | | FIG. 26 | | | | | 4 | 2 | 44 | 65 | 380 |
| Sample 56 | | FIG. 27 | | | | | 2 | 4 (P1) | 59 | 14 | 450 |
| Sample 57 | Fifth Direction | | | | | | 2 | 8 (P2) | | 11 | 400 |
| Sample 58 | Third Direction | FIG. 28 | | | | | 4 (W6) 8 (W7) | 2 | 41 | 64 | 380 | lyte; 60: oxygen electrode; 70: oxygen electrode current collector; 80: interconnector; 100: fuel cell; 110: interconnector; 120: hydrogen generation electrode; 130: diaphragm; 140: oxygen generation electrode; 150: interconnector; 200: water electrolysis device; 300: water electrolysis device; 310: hydrogen generation electrode; 320: oxygen generation electrode; 330: diaphragm; 340: bipolar plate; 350*a*: plate spring; 350*b*: plate spring; 360*a*: frame; 360*b*: frame; 360*aa*: opening portion; 360*ab*: hole; 360*ac*: hole; 360*ba*: opening portion; 360*bb*: hole; 360*bc*: hole; 370: support; D, D1, D2, D3 D4: depth; DR1: first direction; DR2: second direction; DR3: third direction; DR4: fourth direction; DR5: fifth direction; DR6: sixth direction; P, P1, P2: pitch; S1: metal porous body formation step; S2: trench formation step; S11: base porous body preparation step; S12: conductive treatment step; S13: plating step; S14: post-treatment step; T: thickness; W, W1, W2, W3, W4, W5, W6 W7: width; L: length.

The invention claimed is:

1. A water electrolysis device comprising:
a metal porous sheet comprising:
    a metal porous body having a skeleton with a three-dimensional network structure,
    the metal porous sheet having a first main surface and a second main surface which is opposite to the first main surface, and
    at least one trench being formed only in the first main surface; and an interconnector arranged to face the first main surface, wherein:
    a depth of the at least one trench being more than or equal to 10 percent of a thickness of the metal porous sheet and less than or equal to 90 percent of the thickness of the metal porous sheet,
    an area of the at least one trench more than or equal to 10 percent of an area of the main surface in a plan view,
    the skeleton has a skeleton main body formed of a metal material and an internal space defined by the skeleton main body, and there is a pore defined by the skeleton in the metal porous body,
    the at least one trench extends across an entirety of the metal porous sheet,
    the at least one trench is configured to intersect a direction of an aqueous solution supplied through the water electrolysis device such that the aqueous solution crosses in a direction orthogonal to a length of the at least one trench, and
    wherein all trenches on the metal porous sheet only extend in the same direction.

2. The water electrolysis device according to claim 1, wherein the depth of the at least one trench is more than or equal to 30 percent and less than or equal to 90 percent of the thickness of the metal porous sheet.

3. The water electrolysis device according to claim 1, wherein the area of the at least one trench is more than or equal to 30 percent and less than or equal to 90 percent of the area of the main surface in a plan view.

4. The water electrolysis device according to claim 1, wherein
    the at least one trench has a first side surface and a second side surface facing each other in a cross sectional view, and
    a distance between the first side surface and the second side surface decreases with distance from the main surface.

5. The water electrolysis device according to claim 1, wherein
    there are a plurality of trenches,
    the plurality of the trenches are arranged to form a plurality of columns extending along a first direction in a plan view, and
    depths of the trenches belonging to each of the columns increase from one side in the first direction toward the other side in the first direction.

6. The water electrolysis device according to claim 1, wherein the skeleton has a hollow cylindrical shape.

7. The water electrolysis device according to claim 1, wherein the skeleton main body has a triangular shape in a cross section intersecting an extending direction.

8. The water electrolysis device according to claim 1, wherein the at least one trench does not penetrate the metal porous sheet.

9. A fuel cell comprising:
a metal porous sheet comprising:
    a metal porous body having a skeleton with a three-dimensional network structure,
    the metal porous sheet having a first main surface and a second main surface which is opposite to the first main surface, and
    at least one trench being formed only in the first main surface; and an interconnector arranged to face the main surface, wherein:
    a depth of the at least one trench is more than or equal to 10 percent of a thickness of the metal porous sheet and less than or equal to 90 percent of the thickness of the metal porous sheet,
    an area of the at least one trench is more than or equal to 10 percent of an area of the main surface in a plan view,
    the skeleton has a skeleton main body formed of a metal material and an internal space defined by the skeleton main body, and there is a pore defined by the skeleton in the metal porous body,
    the at least one trench extends across an entirety of the metal porous sheet,
    the at least one trench is configured to intersect a direction of an aqueous solution supplied through the fuel cell such that the aqueous solution crosses in a direction orthogonal to a length of the at least one trench and
    wherein all trenches on the metal porous sheet only extend in the same direction.

* * * * *